(12) United States Patent
Meyer

(10) Patent No.: US 11,462,074 B2
(45) Date of Patent: Oct. 4, 2022

(54) GAMING DEVICE WITH DYNAMICALLY CHANGING REEL STRIPS

(71) Applicant: Aristocrat Technologies Australia Pty Limited, North Ryde (AU)

(72) Inventor: Jason Meyer, Wyoming (AU)

(73) Assignee: Aristocrat Technologies Australia PTY Limited, North Ryde (AU)

( * ) Notice: Subject to any disclaimer, the term of this patent is extended or adjusted under 35 U.S.C. 154(b) by 0 days.

(21) Appl. No.: 16/950,637

(22) Filed: Nov. 17, 2020

(65) Prior Publication Data
US 2021/0150849 A1    May 20, 2021

(30) Foreign Application Priority Data

Nov. 19, 2019  (AU) ................................ 2019904353
Sep. 29, 2020  (AU) ................................ 2020244446

(51) Int. Cl.
*G07F 17/34* (2006.01)
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3244* (2013.01); *G07F 17/3267* (2013.01)

(58) Field of Classification Search
CPC .. G06F 7/588; G07F 17/3213; G07F 17/3244; G07F 17/3267
See application file for complete search history.

(56) References Cited

U.S. PATENT DOCUMENTS

| | | | |
|---|---|---|---|
| 5,085,436 A * | 2/1992 | Bennett | G07F 17/3244 273/143 R |
| 8,360,851 B2 | 1/2013 | Aoki | |
| 10,810,829 B2 | 10/2020 | Casey | |
| 2005/0054434 A1* | 3/2005 | Baerlocher | G07F 17/3253 463/25 |

(Continued)

FOREIGN PATENT DOCUMENTS

AU    2000073928 B2    6/2001

OTHER PUBLICATIONS

Tarzan Grand Slot-5 Symbol Trigger-Big Win Bonus!, https://www.youtube.com/watch?v=z37_PFd5OJc, Nov. 12, 2018, 1 page.

*Primary Examiner* — Justin L Myhr
(74) *Attorney, Agent, or Firm* — Brownstein Hyatt Farber Schreck, LLP

(57) ABSTRACT

A gaming device, a method of operating a gaming device, and a gaming system, in which a game includes multiple reels of symbols, and in which symbols of one of the reels are dynamically selected depending on the outcome of symbol selection on other reels. In embodiments, symbols of a third reel may be selected in response to a triggering combination on first and second reels. In an example, the third reel strip is changed from a default reel strip of symbols to a guaranteed win reel strip if symbols from the first and second reel strips include one of multiple possible triggering combinations of symbols. In an example, the third to fifth reel strips may have configurable symbols (e.g. cash on reels symbols) and each triggering combination of symbols corresponds the configurable symbols for later reels being configured differently.

20 Claims, 14 Drawing Sheets

(56) References Cited

U.S. PATENT DOCUMENTS

| | | | |
|---|---|---|---|
| 2006/0189380 A1* | 8/2006 | Schultz | G07F 17/34 463/20 |
| 2014/0274285 A1* | 9/2014 | Meyer | G07F 17/34 463/20 |
| 2015/0080088 A1* | 3/2015 | Smalley | G07F 17/3213 463/20 |
| 2018/0225915 A1* | 8/2018 | Hughes | G07F 17/3225 |
| 2019/0139374 A1* | 5/2019 | Berman | G07F 17/3244 |

* cited by examiner

| Reel strip position | Reel 1 | Reel 2 | Reel 3 | Reel 4 | Reel 5 |
|---|---|---|---|---|---|
| 1 | Pic1 | K | Pic3 | COR | Pic1 |
| 2 | K | Q | K | Wild | COR |
| 3 | J | Wild | COR | COR | COR |
| 4 | Scat | Pic1 | Pic2 | COR | Wild |
| 5 | Pic3 | A | COR | Pic2 | Pic2 |
| 6 | K | 9 | K | Pic1 | COR |
| 7 | Q | Pic4 | K | Pic1 | COR |
| 8 | Pic 2 | J | Wild | COR | Pic3 |
| 9 | A | Q | COR | COR | COR |
| 10 | Q | Wild | Pic1 | COR | Pic1 |
| 11 | Pic2 | Pic3 | COR | Pic1 | COR |
| 12 | Pic2 | Q | Pic3 | Pic1 | COR |
| 13 | A | K | A | COR | COR |
| 14 | Pic3 | Pic2 | Q | Pic4 | Pic4 |
| 15 | K | Scat | J | Pic4 | COR |
| 16 | K | 10 | COR | Pic2 | Scat |
| 17 | J | 9 | COR | COR | COR |
| 18 | Pic4 | Pic2 | Scat | COR | Pic1 |
| 19 | Q | Q | Pic2 | COR | Pic1 |
| 20 | 10 | Q | J | COR | COR |
| 21 | Pic1 | Pic1 | Pic3 | Pic3 | COR |
| 22 | J | J | Pic4 | Pic3 | Pic2 |
| 23 | J | K | K | COR | COR |
| 24 | 2 | Pic3 | COR | COR | COR |
| 25 | Pic 2 | Pic3 | COR | Pic2 | Pic3 |
| 26 | A | Pic4 | Pic3 | COR | Pic4 |
| 27 | Pic4 | Scat | Q | COR | Pic4 |
| 28 | Pic4 | K | Pic2 | Wild | COR |
| 29 | Pic4 | Pic4 | J | COR | Pic 2 |
| 30 | Q | Q | Pic4 | COR | COR |

FIG. 3

GAMING DEVICE WITH DYNAMICALLY CHANGING REEL STRIPS

CROSS-REFERENCE TO RELATED APPLICATIONS

The present application claims priority to Australian Patent Application Serial No. 2019904353 filed Nov. 19, 2019 and Australian Patent Application Serial No. 2020244446 filed Sep. 29, 2020, which are hereby incorporated by reference in their entireties.

FIELD

The present application relates to a gaming device, a method of operating a gaming device and a gaming system.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Disclosed are: a gaming device, a method of operating a gaming device and a gaming system where a reel strip for at least one of the reels is dynamically selected depending on the outcome of symbol selection on other reels. In an example, the third reel strip is changed from a default reel strip to a guaranteed win reel strip if symbols selected from the first and second reel strips include one of a plurality of triggering combinations of symbols. In an example, the third to fifth reel strips have configurable symbols (e.g. cash on reels symbols) and each triggering combination of symbols corresponds the configurable symbols being configured differently.

As a result, example embodiments may implement a trigger data structure, stored in memory and defining multiple potential triggering combinations, such as correlations between selected symbols of first and second reel strips of a reel strip (such as a match of configurable symbols along a position, such as a payline). Occurrence of a triggering condition defined by that trigger data structure may be used to initiate configuration of a portion of the reel strip data structure defining symbols for one or more additional reel strips. In some examples, the configuration can include populating the reel strip data structure for a third reel (and/or additional reel) with configurable symbols selected from those found in the first and/or second reels.

The use of multiple triggering conditions based on correlations in symbols of selected reels to populate symbols in additional reels in accordance with the example techniques described herein, can be implemented to provide gameplay including generating a guaranteed "win" result for a player that can promote player satisfaction. In addition, such trigger conditions provide enhanced game play to players that is not repetitive or predictable, such as those triggers that are based on a predetermined symbol or predetermined symbol combination. At the same time, such implementations can be implemented to control gaming machine operation in a manner to comply with regulatory requirements and maintain a desired RTP.

A described embodiment provides a gaming device comprising a display, a processor, and a memory storing (i) a trigger data structure defining a first triggering combination of symbols, (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, and (iii) instructions. When the instructions are executed by the processor, they cause the processor to conduct a random symbol selection process to populate the plurality of columns of symbol positions with symbols. The symbol selection process comprises selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip. When the instructions are executed by the processor, they also cause the processor to control the display to display the selected symbols at the respective symbol positions, evaluate the selected symbols to determine whether to make one or more prize awards including by, where the guaranteed win reel strip is used, determining the at least one prize award based on at least the selected symbols for the third column, and increment a win meter by each made prize award.

Another described embodiment provides a method of operating a gaming device comprising a display and a memory storing (i) a trigger data structure defining a first triggering combination of symbols, and (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols. The method comprises conducting a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip. The method also comprises controlling the display to display the selected symbols at the respective symbol positions, evaluating the selected symbols to determine whether to make one or more prize awards including by, where the guaranteed win reel strip is used, determining the at least one prize award based on at least the selected symbols for the third column, and incrementing a win meter by each made prize award.

Another described embodiment provides a system comprising one or more processors, and at least one memory storing (i) a trigger data structure defining a first triggering combination of symbols, (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, and (iii) instructions. When executed by the one or more processors, the instructions cause the one or more processors to conduct a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip. When executed by the one or more processors, the instructions also cause the one or more processors to control a display to display the selected symbols at the respective symbol positions, evaluate the selected symbols to determine whether to make one or more prize awards including by, where the guaranteed win reel strip is used, determining the at least one prize award based on at least the selected symbols for the third column, and increment a win meter by each made prize award.

Another described embodiment provides a gaming device comprising a display, a processor, and a memory storing (i) a trigger data structure defining a plurality of triggering combinations of symbols comprising at least a first triggering combination of symbols and a second triggering combination of symbols, (ii) a reel strip data structure defining a plurality of reel strips and defining an association between each reel strip and one of a plurality of columns of symbol positions, the plurality of reel strips including default reel strips associated with each of the plurality of columns, and (iii) instructions. When the instructions are executed by the processor, they cause the processor to conduct a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips. When executed by the one or more processors, the instructions also cause the processor to control the display to display the selected symbols at the respective symbol positions, evaluate the selected symbols to determine whether to make one or more prize awards, and increment a win meter by each made prize award.

Another described embodiment provides a method of operating a gaming device comprising a display, and a memory storing (i) a trigger data structure defining a plurality of triggering combinations of symbols comprising at least a first triggering combination of symbols and a second triggering combination of symbols, and (ii) reel strip data structure defining a plurality of reel strips and defining an association between each reel strip and one of a plurality of columns of symbol positions, the plurality of reel strips including default reel strips associated with each of the plurality of columns. The method comprises conducting a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips. The method also comprises controlling the display to display the selected symbols at the respective symbol positions, evaluating the selected symbols to determine whether to make one or more prize awards, and incrementing a win meter by each made prize award.

Another described embodiment provides gaming system comprising one or more processors, and at least one memory storing (i) a trigger data structure defining a plurality of triggering combinations of symbols comprising at least a first triggering combination of symbols and a second triggering combination of symbols, (ii) a reel strip data structure defining a plurality of reel strips and defining an association between each reel strip and one of a plurality of columns of symbol positions, the plurality of reel strips including default reel strips associated with each of the plurality of columns, and (iii) instructions. When the instructions are executed by the one or more processors, they cause the one or more processors to conduct a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips. When the instructions are executed by the one or more processors, they also cause the one or more processors to control a display to display the selected symbols at the respective symbol positions, evaluate the selected symbols to determine whether to make one or more prize awards, and increment a win meter by each made prize award.

Another described embodiment includes one or more non-transitory media including software stored thereon, the software including instructions for controlling one or more devices to perform a method, the method comprising: retaining in the non-transitory media (i) a trigger data structure defining a plurality of triggering combinations of symbols comprising at least a first triggering combination of symbols and a second triggering combination of symbols, and (ii) reel strip data structure defining a plurality of reel strips and defining an association between each reel strip and one of a plurality of columns of symbol positions, the plurality of reel strips including default reel strips associated with each of the plurality of columns; conducting a random symbol selection process to populate the plurality of columns of symbol positions with symbols, the symbol selection process comprising, selecting symbols from first and second default reel strips for the first and second columns, In the absence of the triggering combination is defined by the trigger data structure, selecting symbols for the third to fifth columns by selecting symbols from the third to fifth default reel strips; in response to determining occurrence of a triggering combination as defined by the trigger data structure, executing a triggered process comprising, upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and initiating control of a display to display the selected symbols at the respective symbol positions; evaluating the selected symbols to determine whether to make one or more prize awards: and incrementing a win meter by each made prize award.

BRIEF DESCRIPTION OF THE DRAWINGS

FIG. 3 illustrates an example reel strip layout.

DETAILED DESCRIPTION

Figure 1:
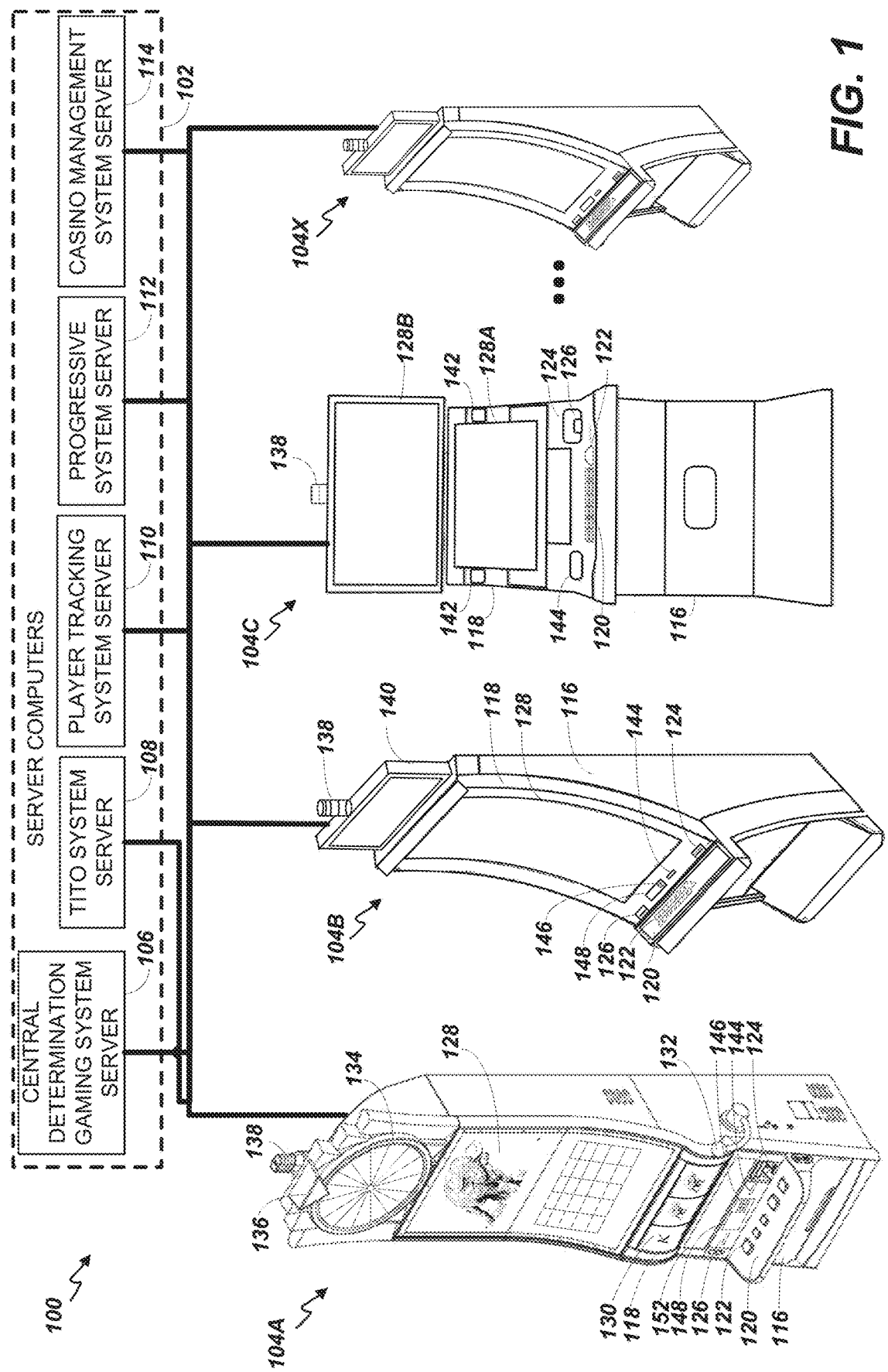
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Rem XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
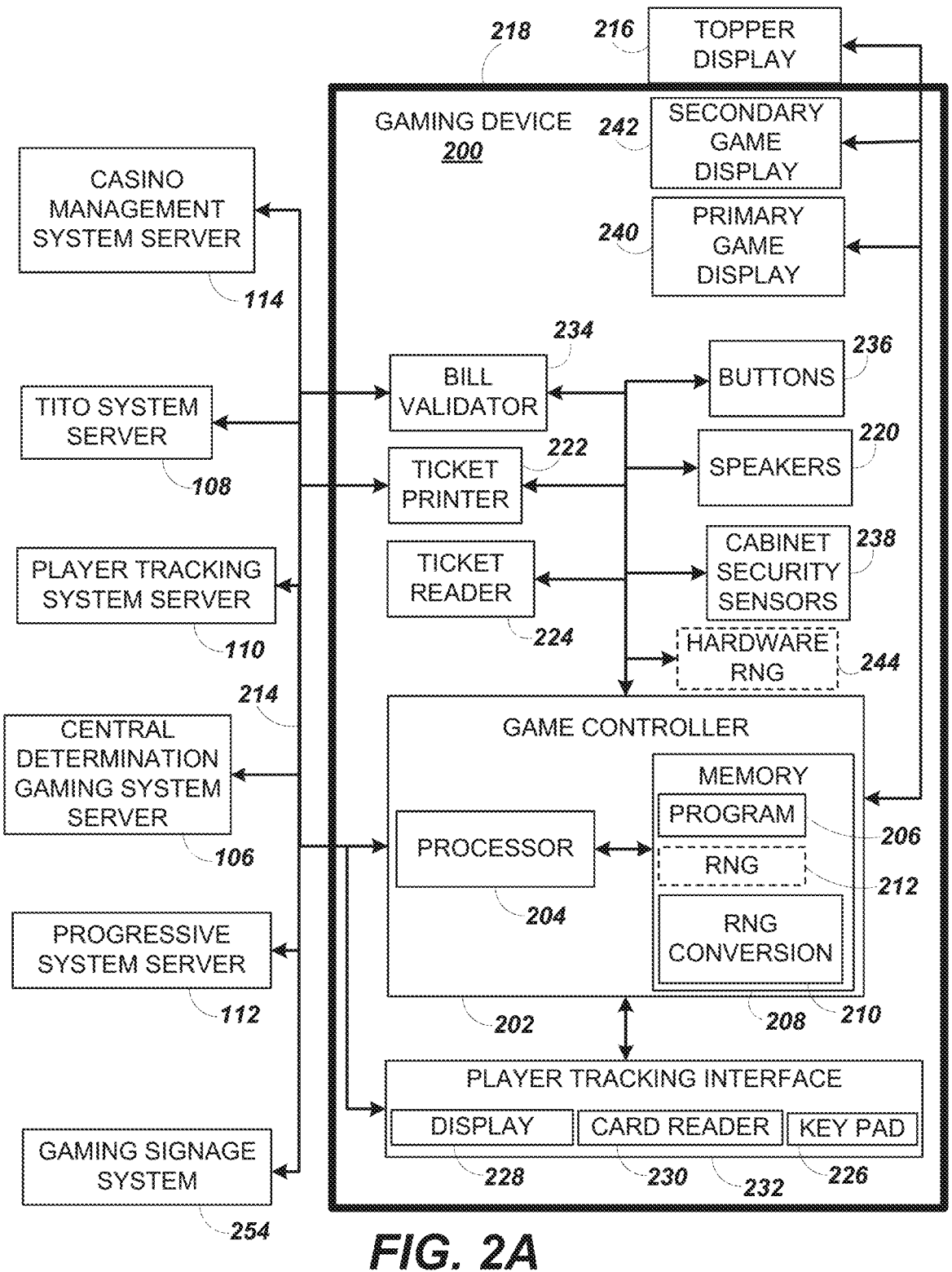
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data. For example, various data structures of the currently disclosed techniques (trigger data structure, reel strip data structure, a configuring symbol data structure, for example, and others as described herein) may be stored in one, or across multiple, such storage media).

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
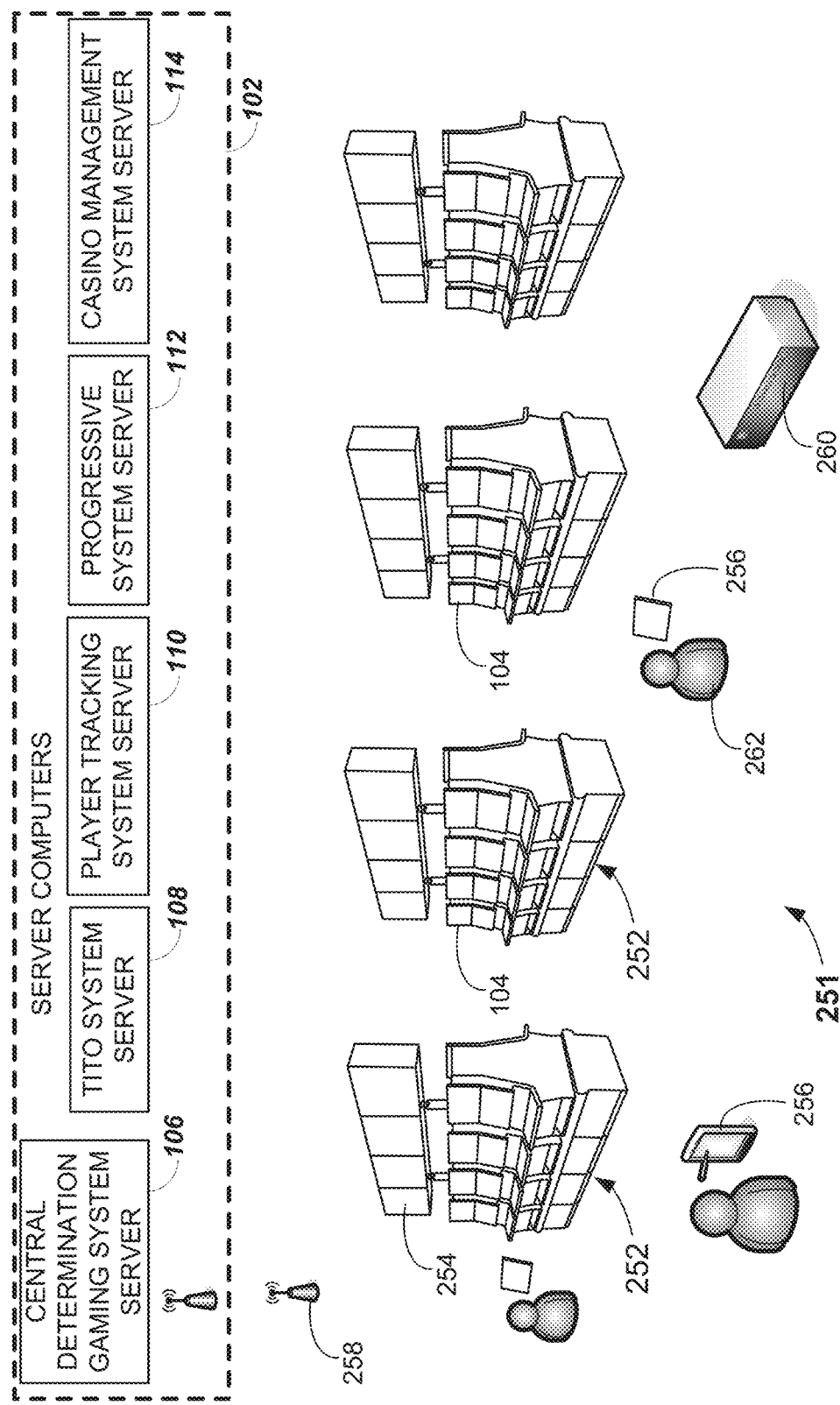
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
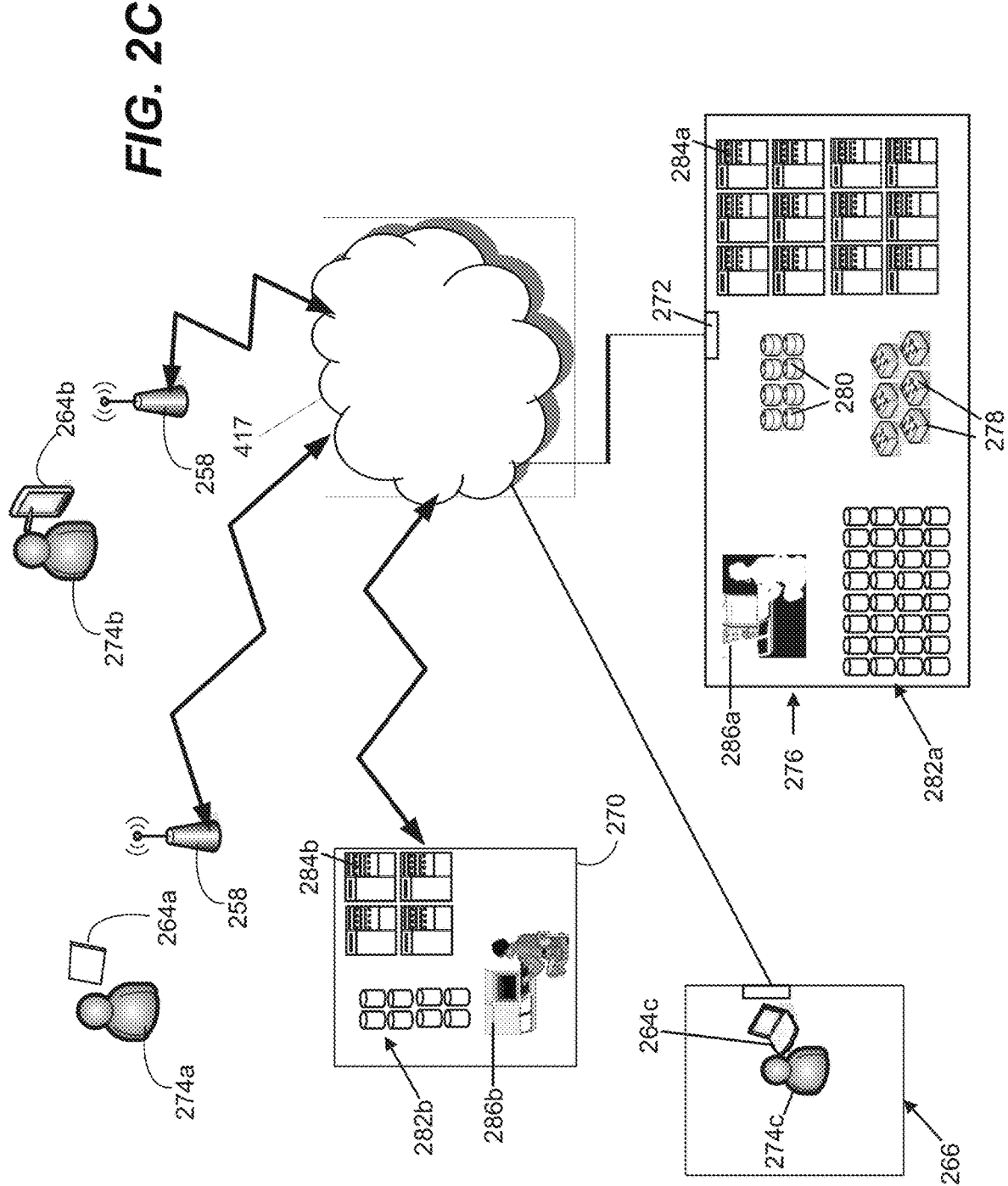
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a players "cash in" selections, wagering game results and a players "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 2D:
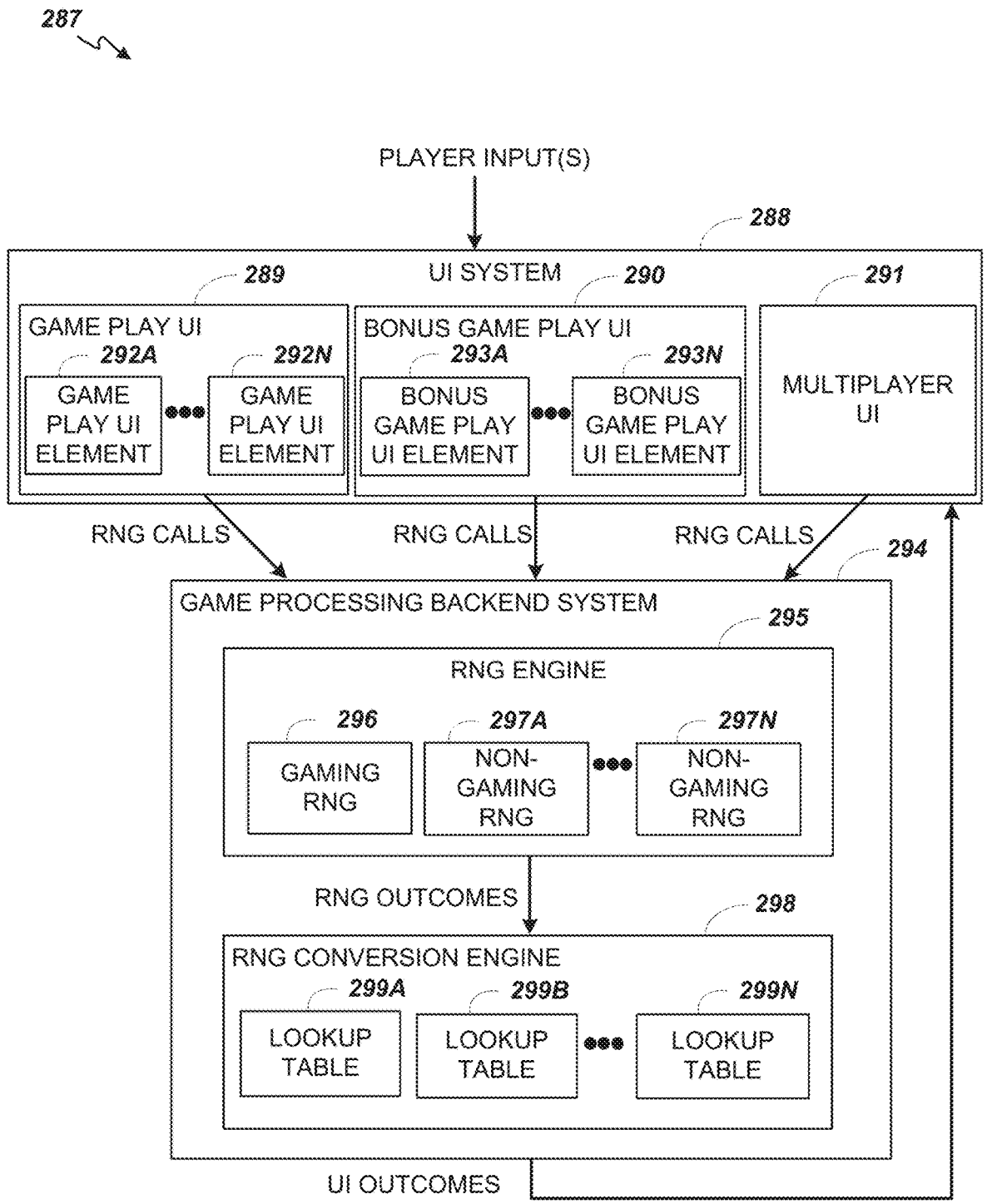
FIG. 2D illustrates, in block diagram form, an implementation of a game processing architecture algorithm that implements a game processing pipeline for the play of a game in accordance with various implementations described herein.

FIG. 2D illustrates, in block diagram form, an implementation of a game processing architecture 287 that implements a game processing pipeline for the play of a game in accordance with various implementations described herein. As shown in FIG. 2D, the gaming processing pipeline starts with having a UI system 288 receive one or more player inputs for the game instance. Based on the player input(s), the UI system 288 generates and sends one or more RNG calls to a game processing backend system 294. Game processing backend system 294 then processes the RNG calls with RNG engine 295 to generate one or more RNG outcomes. The RNG outcomes are then sent to the RNG conversion engine 298 to generate one or more game outcomes for the UI system 288 to display to a player. The game processing architecture 287 can implement the game processing pipeline using a gaming device, such as gaming devices 104A-104X and 200 shown in FIGS. 1 and 2, respectively. Alternatively, portions of the gaming processing architecture 287 can implement the game processing pipeline using a gaming device and one or more remote gaming devices, such as central determination gaming system server 106 shown in FIG. 1.

The UI system 288 includes one or more UIs that a player can interact with. The UI system 288 could include one or more game play UIs 289, one or more bonus game play UIs 290, and one or more multiplayer UIs 291, where each UI type includes one or more mechanical UIs and/or graphical UIs (GUIs). In other words, game play UI 289, bonus game play UI 290, and the multiplayer UI 291 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 2D as an example, the different UI elements are shown as game play UI elements 292A-292N and bonus game play UI elements 293A-293N.

Figure 13:
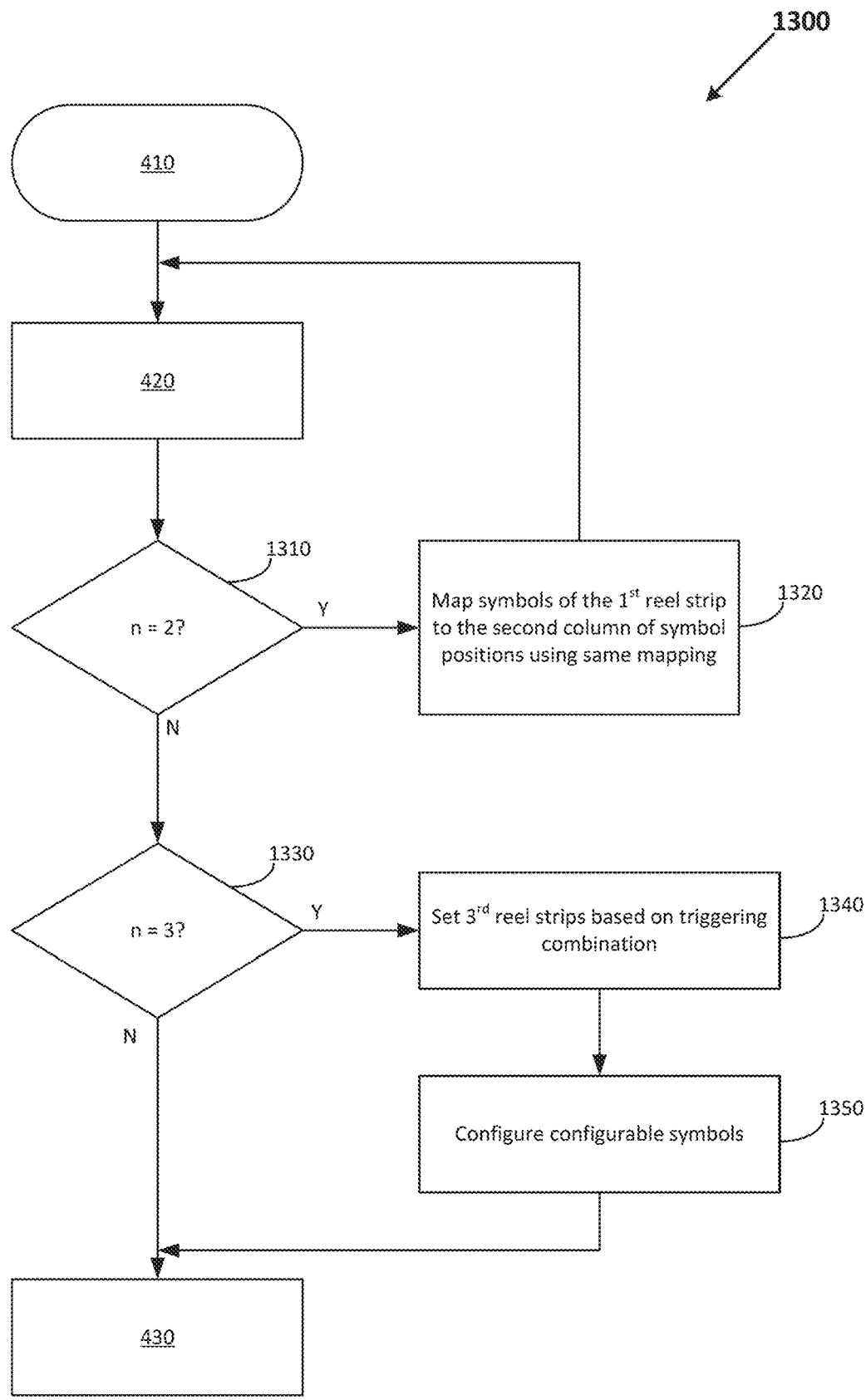
FIG. 13 is a flow chart of a modified symbol selection method.

The game play UI 289 represents a UI that a player typically interfaces with for a base game. During a game instance of a base game, the game play UI elements 292A-292N (e.g., GUI elements depicting one or more virtual reels) are shown and/or made available to a user. In a subsequent game instance, the UI system 288 could transition out of the base game to one or more bonus games. The bonus game play UI 290 represents a UI that utilizes bonus game play UI elements 293A-293N for a player to interact with and/or view during a bonus game. In one or more implementations, at least some of the game play UI element 292A-292N are similar to the bonus game play UI elements 293A-293N. In other implementations, the game play UI element 291A-292N can differ from the bonus game play UI elements 293A-293N. The methods described below, for example in reference to FIGS. 4 and 13, include configuring reel strips, such as those of UI system 288, for example in either or both of game play UIs 289 and bonus game play UIs 290.

FIG. 2D also illustrates that UI system 289 could include a multiplayer UI 291 purposed for game play that differs or is separate from the typical base game. For example, multiplayer UI 291 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 295 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 2D does not explicitly depict that multiplayer UI 294 includes UI elements, multiplayer UI 291 could also include one or more multiplayer UI elements.

Based on the player inputs, the UI system 288 could generate RNG calls to a game processing backend system 294. As an example, the UI system 288 could use one or more application programming interfaces (APIs) to generate the RNG calls. To process the RNG calls, the RNG engine 295 could utilize gaming RNG 296 and/or non-gaming RNGs 297A-297N. Gaming RNG 296 could corresponds to RNG 212 or hardware RNG 244 shown in FIG. 2A. As previously discussed with reference to FIG. 2A, gaming RNG 296 often performs specialized and non-generic operations that comply with regulatory and/or game requirements. For example, because of regulation requirements, gaming RNG 296 could correspond to RNG 212 by being a cryptographic RNG or pseudorandom number generator (PRNG) (e.g., Fortuna PRNG) that securely produces random numbers for one or more game features. To securely generate random numbers, gaming RNG 296 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 298 processes each RNG outcome from RNG engine 295 and converts the RNG outcome to a UI outcome that is feedback to the UI system 288. With reference to FIG. 2A, RNG conversion engine 298 corresponds to RNG conversion engine 210 used for game play. As previously described, RNG conversion engine 298 translates the RNG outcome from the RNG 212 to a game outcome presented to a player. RNG conversion engine 298 utilizes one or more lookup tables 299A-299N to regulate a prize payout amount for each RNG outcome and how often the gaming device pays out the derived prize payout amounts. In one example, the RNG conversion engine 298 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 294 sends the UI outcome to the UI system 288. Examples of UI outcomes are symbols to display on a video reel or reel stops for a mechanical reel. In one example, if the UI outcome is for a base game, the UI system 288 updates one or more game play UI elements 292A-292N, such as symbols, for the game play UI 289. In another example, if the UI outcome is for a bonus game, the UI system could update one or more bonus game play UI elements 293A-293N (e.g., symbols) for the bonus game play UI 290. In response to updating the appropriate UI, the player may subsequently provide additional player inputs to initiate a subsequent game instance that progresses through the game processing pipeline.

Figure 4:
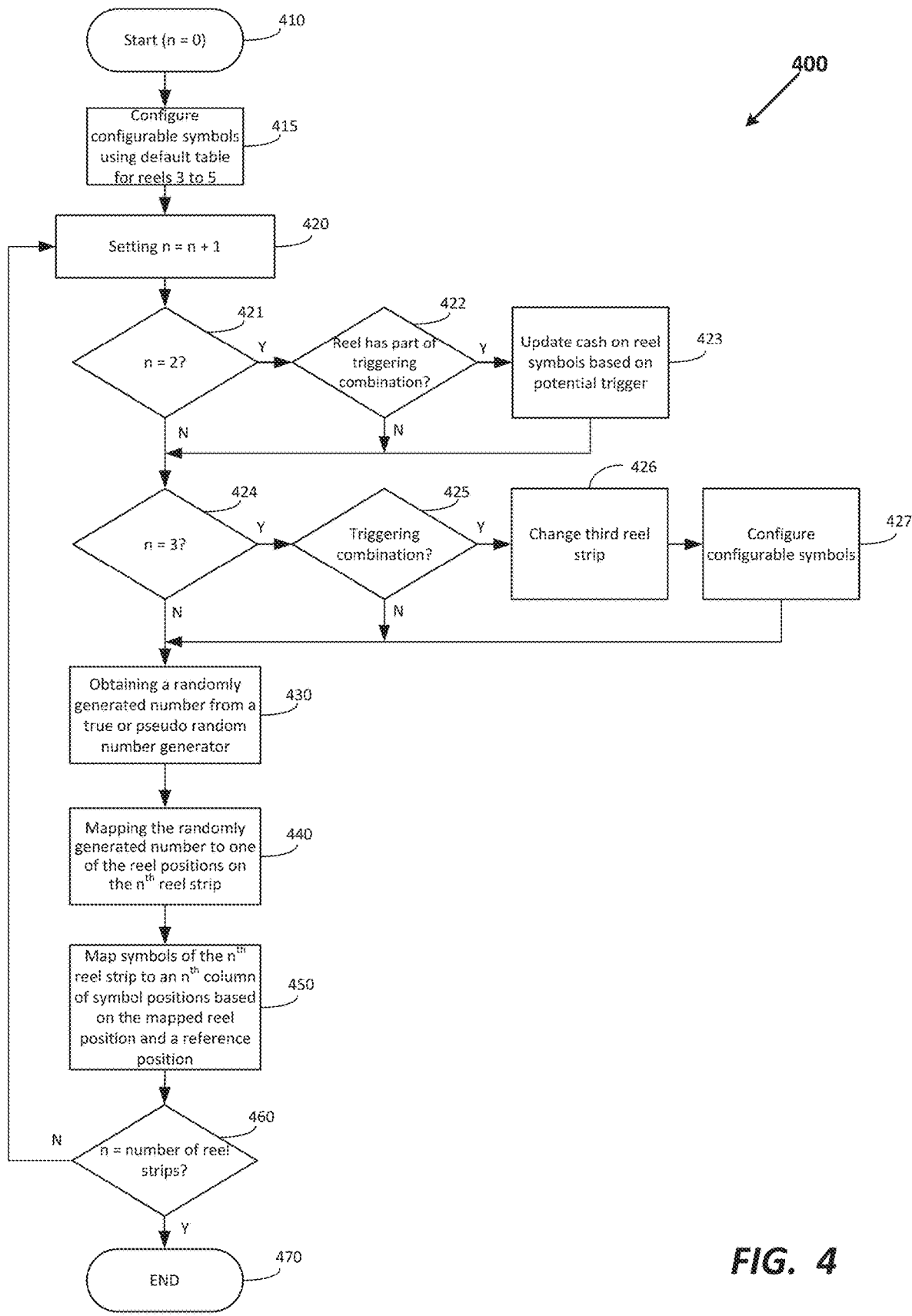
FIG. 4 is a flow chart of a symbol selection method.
Figure 5:
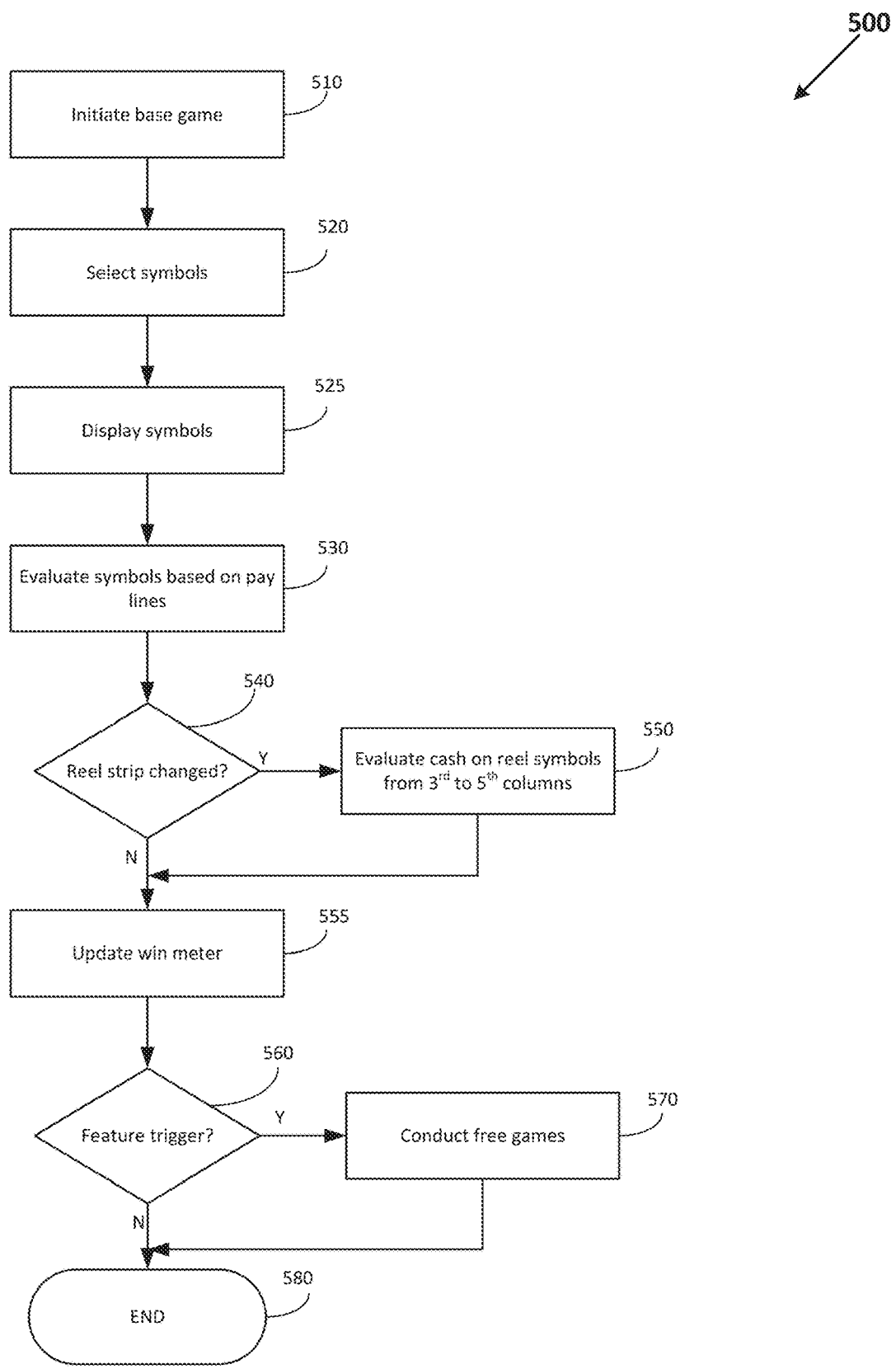
FIG. 5 is a flow chart of a method of operating a gaming device.

FIG. 5 is a flow chart of a method 500 of operating a gaming device 200. The below-described operations of method 500 carried out by a processor, (in the present examples processor 204), can be implemented in response to software stored in memory 208, for example non-volatile media which includes instructions that, when executed result, in the described operations (as well as the described operations of example methods 400 and 1300 of FIGS. 4 and 13, respectively). At step 510, the processor 204 initiates a base game, for example, in response to input of a play instruction by the player pressing a button. At step 520, the processor 204 (FIG. 2A) selects symbols for display in a plurality of columns of symbol positions. In an example, such as that shown in FIG. 8, there are five columns of symbol positions 811-815 each having three symbol positions and the processor 204 controls the display to animate the reel strips as spinning through the symbol positions (as captured in FIG. 8) during the selection process before stopping the reel strips from left to right as this is consistent with the order of evaluation of the reel strips for winning combinations.

FIGS. 3 and 4 illustrate an example symbol selection process. Specifically, FIG. 3 illustrates an example of a set 300 of five reel strips 341, 342, 343, 344, 345 of a plurality of reel strips stored in a reel strip data structure in memory 208. In the example, each reel strip has thirty reel strip positions 301-330. Each reel strip position of each reel has a symbol. For example, a "Wild" symbol 331 occupies the twenty-eighth reel strip position 328 of the fourth reel 344. The example reel strips of FIG. 3 are a default set of reel strips. Each of the first reel strip 341 and second reel strip 342 have Pic1, Pic2, Pic3 and Pic4 symbols. In an example, these symbols can form triggering symbol combinations, specifically, Pic1-Pic1, Pic2-Pic2, Pic3-Pic-3, and Pic4-Pic4 which are stored in a triggering symbol data structure in memory 208. An advantage of each triggering symbol combination being formed from a single symbol is that it is easy for the player to understand when a triggering combination is formed, however, in other examples, triggering symbol combinations can be formed of different symbols, for example, two symbols having related characteristics such as different male and female symbols, salt and pepper symbols and knife and fork symbols. In the example of FIG. 3, the third to fifth reel strips also have Pic1, Pic2, Pic3 and Pic4 symbols in order to enable prizes to be awarded even when a triggering combination isn't selected, for example if a Pic1 symbol lands on reel 1 in conjunction with one of Wild symbols 354,355. Each of the third to fifth reel strips 643-645 have configurable symbols—i.e. the "COR" symbols. COR stands for "Cash on Reels" as in this example each configurable symbol is configured with a prize value by processor 204 when the symbols are selected as described below.

Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips.

At step 415, prior to selecting symbols, the processor 204 assigns assignable prizes to each configurable symbol of each of the third to fifth reel strips. In this example, this enables the prizes to be seen during at least part of the virtual spinning of the third to fifth reel strips. In an example, a symbol configuring data structure in memory 208 stores a plurality of weighted tables each comprising a plurality of assignable prizes—i.e. prizes that can be assigned to individual cash on reel symbols. In an example, there are separate default weighted prize tables for each of the third to fifth reel strips. In an example, each weighted table incorporates a plurality of assignable prizes and different weightings are assigned to each prize in order to control their relative probability of being selected.

In an example, the values of the assignable prizes depend on an amount wagered, for example they correspond to a base amount multiplied by bet multiplier. In an example, the assignable prizes may be credit amounts, e.g. 100, 200, or 400 credits or otherwise defined prizes such a bonus or jackpot prizes.

The instructions in memory 208 cause processor 204 to conduct an iterative loop starting with the third reel strip in which the processor 204 randomly selects one of the prizes using a value obtained from random number generator and assigns it to the next configurable symbol in reel strip order until all configurable symbols of a reel strip have been assigned a prize. Processor 204 then iterates to the fourth reel strip and conducts a further iterative loop using the default weighted table of prizes associated with the fourth reel strip and then proceeds to carry out the same process for the fifth reel strip. In some examples, there are more than one category of configurable symbols on one or more of the reel strips, for example the fifth reel strip and prizes are assigned from different weighted tables to the two different categories of configurable symbols. In one example, one weighted table has bonus and/or jackpot prizes and is used to assign prizes to a category of configurable symbols having a number designed to limit the number of bonus and/or jackpot prizes. In some examples, the jackpot prizes may have progressive values that vary over time. In an example, only the weighted table of assignable prizes associated with the fifth reel strip has bonus or jackpot prizes.

In an alternative example, prizes are randomly selected by the processor 204 from a table of prizes without replacement to enable control of the number of instances of one or more prizes.

At step 420, the processor 204 increments the counter. In the first iteration, the counter is set to 1 to reflect that symbols are to be selected from a first reel strip.

At step 421, the processor 204 determines whether symbols have been selected for the first reel by testing whether n=2 and if not, processor 204 proceeds to step 424.

At step 424, the processor 204 determines whether symbols have been selected for the first two reels by testing whether n=3 and if not, processor 204 proceeds to step 430.

At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "Pic@" symbol 352 is mapped to a middle symbol position, and another "Pic 2" symbol 351 is mapped to a top symbol position.

At step 460, the processor 460 determines whether symbols have been selected for all of the reel strips, and if not the processor 204 reverts to step 420.

When it is determined at step 421, that n=2 processor 204 proceeds to step 422 and determines whether the symbols selected for the first column corresponds to one of the defined triggering symbol combinations in trigger data structure in memory 208. In this example, Pic1-Pic1, Pic2-Pic2, Pic3-Pic-3, and Pic4-Pic4. That is, processor 204 determines whether the symbols selected for the first column include one of Pic1, Pic2, Pic3 or Pic4. If one of these symbols are included, the processor 204 proceeds to step 423 and updates the cash on reel symbols on the third to fifth reel strips based on the potential trigger by repeating the process described in relation to step 415.

In this respect, in an example, the symbol configuring data structure stores a plurality of different weighted tables for each of the third to fifth reel strips (in additions to the default tables) which are linked to respective triggering symbol combinations. In an example, the symbols in the triggering combinations have pay table entries that define a relative ranking of the symbols from highest to lowest based on the size of prizes that can be awarded in relation to winning combinations of symbols incorporating the symbols. In this example, the symbols are ranked from highest to lowest in the order Pic1, Pic2, Pic3, and Pic4. In an example, the tables of assignable prize values are configured to be aligned with this relative ranking such that the assignable prizes from the tables associated with Pic1 are (or tend to be) higher than the prizes from the tables associated with Pic2 which, in turn, are (or tend to be) higher than the prizes from the tables associated with Pic3, which, in turn, are (or tend to be) higher than the prizes from the tables associated with Pic4. In this way, the player experience in respect of the configurable symbols is consistent with the prize values associated with the specific symbols in the triggering symbol combinations.

In this respect, Tables 1 and 2 show examples of prize tables that illustrate how a ranking can apply. Table 1 and Table 2 show cash on reel values and probability values corresponding to a ranking from highest to lowest in the order Pic1, Pic2, Pic3, and Pic4.

Table 1 shows an example where the same cash on reel values are obtainable for each Pic symbol but the relative weightings are arranged such that there is an increased probability of receiving a higher prize for a higher ranked symbol.

TABLE 1

| | COR value | Probability |
|---|---|---|
| PIC1 | 500k | 0.4 |
| | 200k | 0.3 |
| | 100k | 0.2 |
| | 40k | 0.1 |
| PIC2 | 500k | 0.25 |
| | 200k | 0.25 |
| | 100k | 0.25 |
| | 40k | 0.25 |
| PIC3 | 500k | 0.1 |
| | 200k | 0.2 |
| | 100k | 0.3 |
| | 40k | 0.4 |
| PIC4 | 500k | 0.05 |
| | 200k | 0.15 |
| | 100k | 0.3 |
| | 40k | 0.5 |

Table 2 shows an alternative example, where different cash on reel values are obtainable for each Pic symbol such that the available prizes depend on the ranking of the symbols.

TABLE 2

| | COR value | Probability |
|---|---|---|
| PIC1 | 500k | 0.1 |
| | 200k | 0.2 |
| | 100k | 0.3 |
| | 40k | 0.4 |
| PIC2 | 30k | 0.2 |
| | 20k | 0.3 |
| | 15k | 0.5 |
| PIC3 | 10k | 0.3 |
| | 5k | 0.7 |
| PIC4 | 4k | 0.2 |
| | 2k | 0.8 |

In other examples, there may be partial overlap in the available prizes for respective symbols.

When it is determined that n=3 at step 424, processor 204 proceeds to step 425 to determine whether the symbols selected for the first two columns correspond to one of the defined triggering symbol combinations in trigger data structure in memory 208. In this example, Pic1-Pic1, Pic2-Pic2, Pic3-Pic-3, and Pic4-Pic4. If there is no triggering combination, the processor 204 continues with the default symbol selection process using the default reel strips of FIG. 3 and iterates through steps 430, 440 and 450 until it is determined at step 460 that symbols have been selected from all n reel strips and mapped to all n columns of symbol positions after which the symbol selection process ends, at 470. The process can be varied such that different numbers of symbols may be mapped to different numbers of symbol positions. It will also be appreciated that the process can readily be adapted for different numbers of reel strips.

Figure 6:
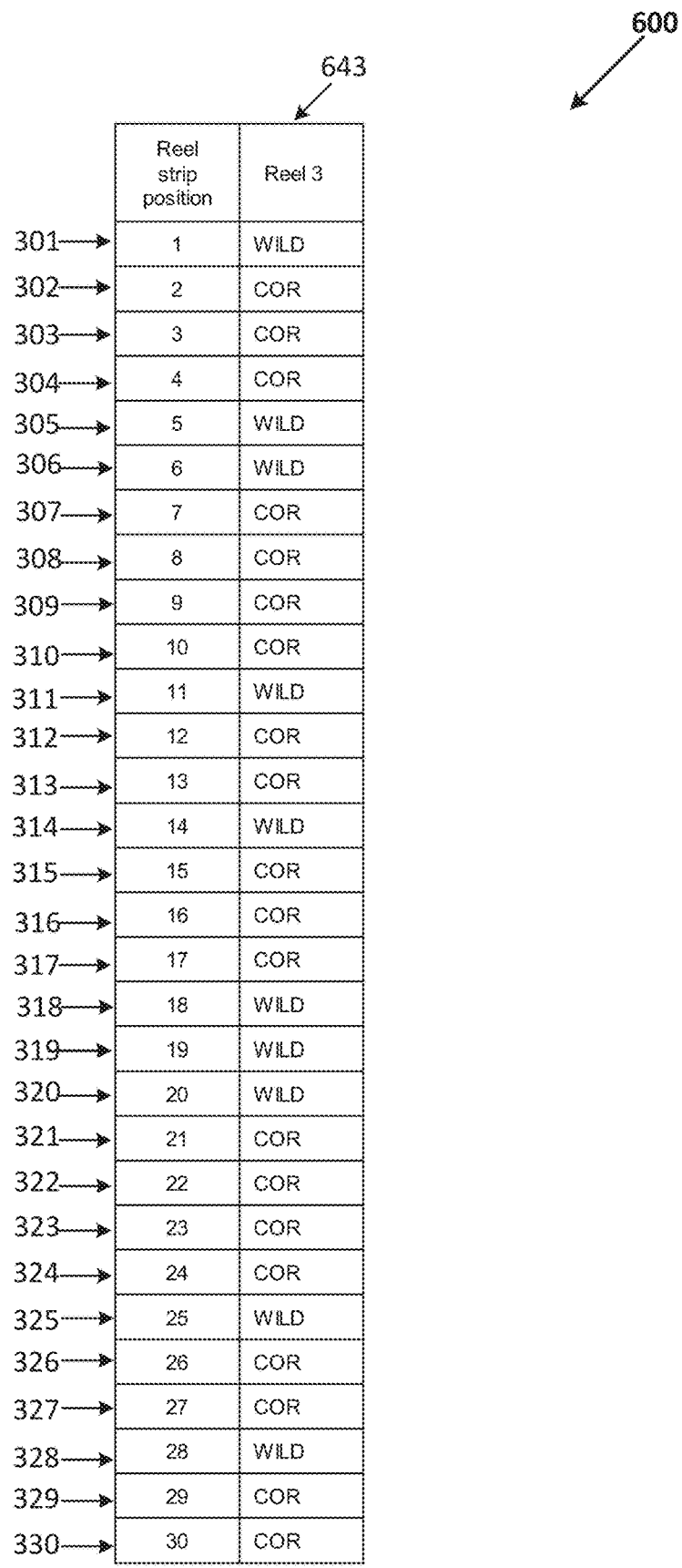
FIG. 6 illustrates an example reel strip layout.

If instead, processor 204 determines at step 425 that there is a triggering symbol combination, processor 204 proceeds to step 426 and changes the reel strip to be used for the third column of symbol positions. FIG. 6 shows an example of a third reel strip. In this example, the third reel strip only has Wild symbols and configurable symbols, as a result the third reel strip is a guaranteed prize strip as it will result in at least one prize being awarded as described below. If the processor 204 changes the third reel strip at step 426, the processor 204 configures the configurable symbols for the third reel strip at step 427 using the process described in relation to step 415 above.

In another example, a modified process is used where processor 204 only assigns prizes to configurable symbols after they have been selected for display at step 450. In an example, the configurable symbols may only reveal the prizes after they land, for example, a question mark symbol may land and then be animated to reveal the prize.

In other examples, each of the third to fifth reel strips may be changed. For example, when the Pic1-Pic1 triggering combination occurs, the fourth and fifth reels may have additional instances of the Pic1 symbol relative to the default reel strips to increase the probability of winning combinations occurring that feature the Pic1 symbol. In this example, the fourth and fifth reel strips set at step 426 are linked to the triggering symbol combination. The composition of the reel strips associated with the other triggering symbol combinations may be similar—i.e. configured to increase the probability of winning outcomes corresponding to the triggering combination.

In other examples, the third to fifth reels strips may not guarantee a winning outcome but may instead be configured to have a higher probability of a winning outcome occurring than the default reel strips.

In other examples, the third reel strip could additionally have Pic symbols, e.g. Pic1 for the Pic1-Pic1 trigger combination, or could have Pic symbols instead of Wild symbols.

After the symbols of all reel strips have been mapped to symbol positions, the processor 204 controls display 240 to display them at the symbol positions at step 525. An example of controlling the display where a triggering symbol combination lands is shown in FIGS. 8 to 11.

Figure 8:
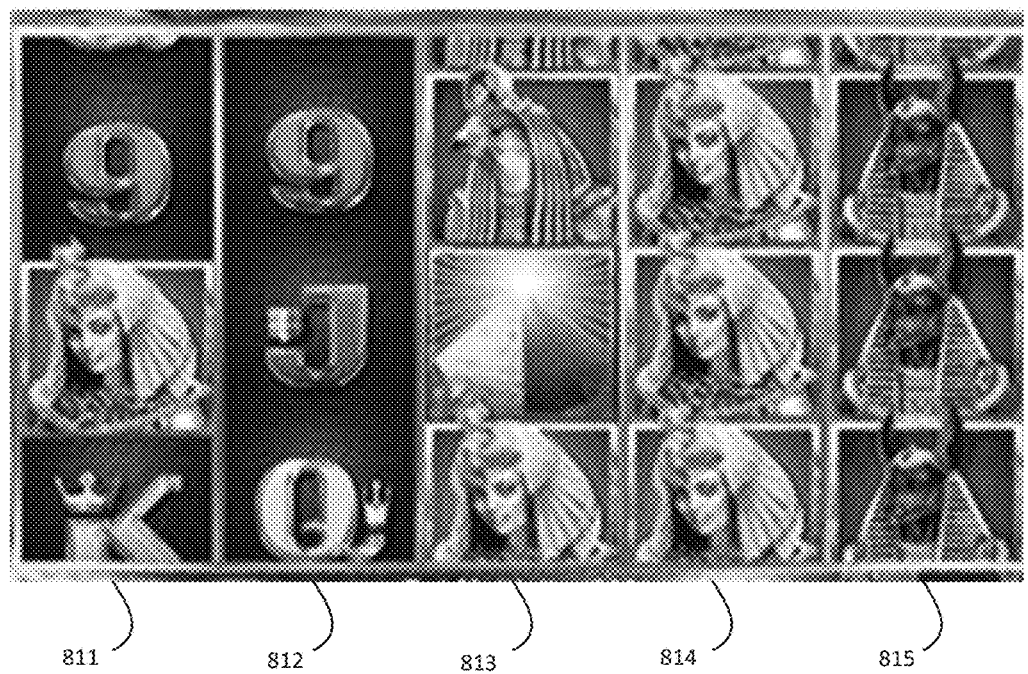
FIGS. 8 to 11 are example screen displays.

FIG. 8 shows that the reel strips are initially spun relative to the columns of symbol positions 811-815 as indicated by the fact that the symbols are offset relative to the symbol positions.

Figure 9:
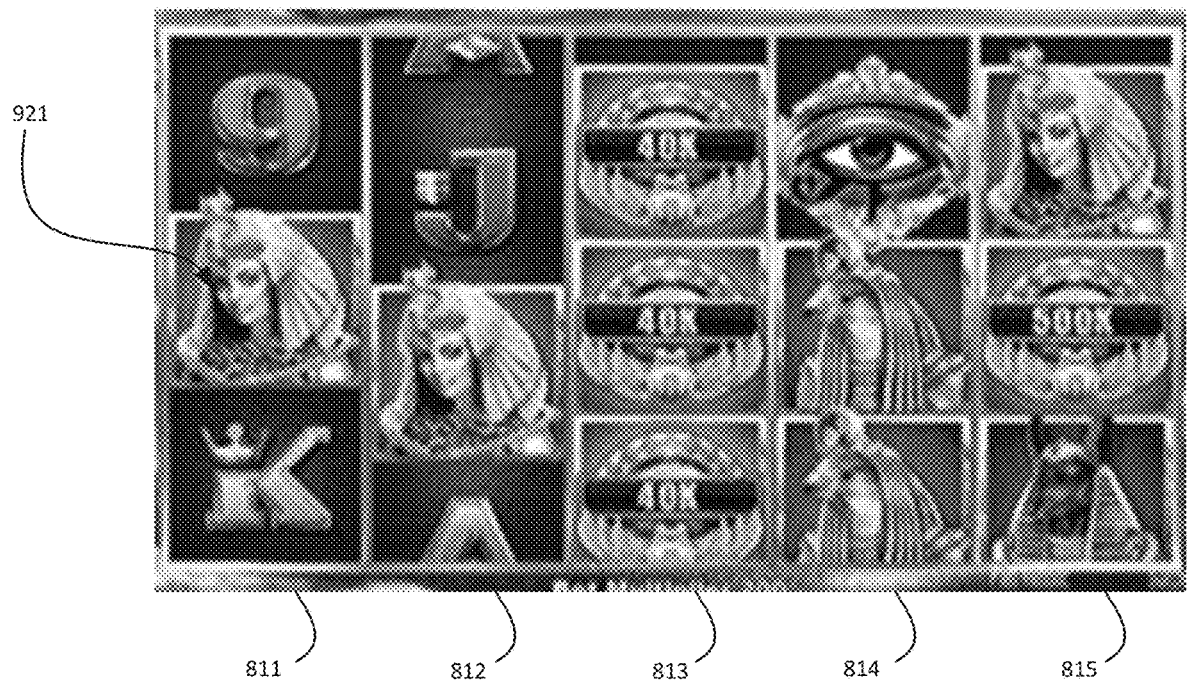

FIG. 9 shows that part of a triggering combination of symbols in the form of an Egyptian queen symbol 921 has been selected for the first column. The reel strips corresponding to the third to fifth columns 813-815 have changed to incorporate prize values on the cash on reel symbols that correspond to the potential triggering combination as explained in relation to steps 421 to 423 above. The second to fifth reel strips continue to spin. The change to the third to fifth reel strips is indicated visually to the player by changing a background color of the cash on reel symbols to the same background color as the triggering symbol (e.g. green).

Figure 10:
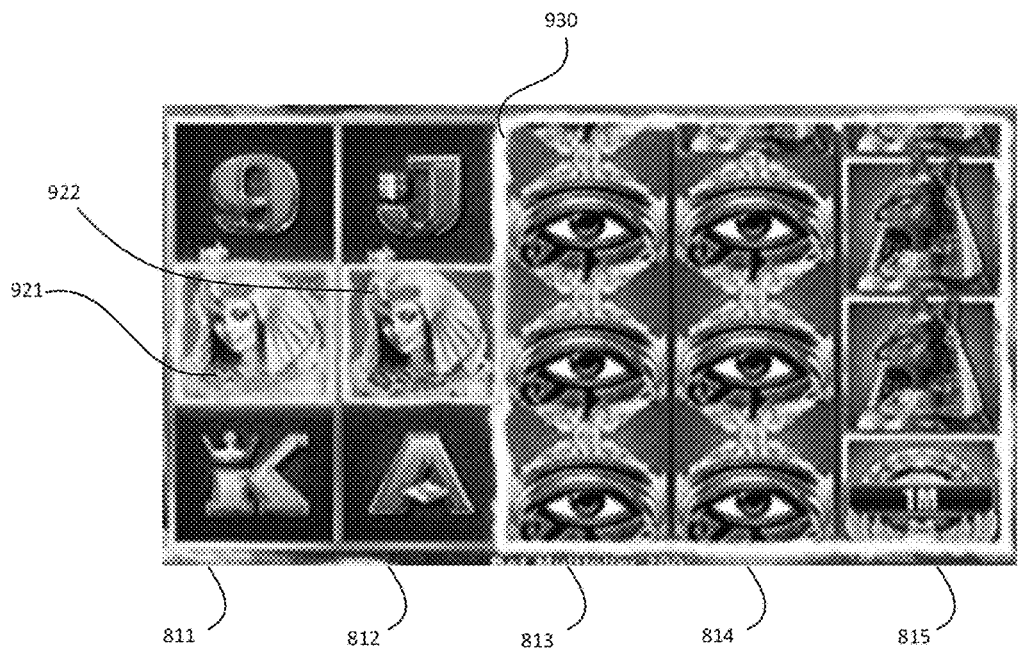

FIG. 10 shows the first and second reel strips having come to a stop with a triggering combination of symbols in the form of a pair of Egyptian queen symbols 921,922. The reel strips corresponding to the third to fifth columns 813-815 have continue to spin. The third reel strip has been changed and the occurrence of the triggering combination is indicated visually to the player by adding a border 930 around the symbol positions of the third to fifth columns 813-815.

FIG. 10 shows an example where the third to fifth columns 813-815 are populated by symbols because the corresponding reel strips have come to a stop. In this case the symbol positions are populated by a wild symbol 940 and eight cash on reel symbols 941-948.

Referring again to FIG. 5, at step 530, processor 204 evaluates the selected symbols (e.g. as displayed in FIG. 10) based on a set of defined paylines. In an example, each available wager results in a player playing all available paylines. In doing so, processor 204 evaluates the symbols from the leftmost column 811 to the right most column 815 to find uninterrupted sequences of three or more of the same symbol (or a wild symbol that can substitute for any symbol except cash on reel symbols and scatter symbols) along a payline. In this example, symbols 921,922 of the triggering combination combine with wild symbol 930 to form a three-of-a kind winning combination and the processor 204 will make an award in respect of this winning combination based on a value for the award defined in the pay table in memory 208. In this example, the configuration of the set of pay lines ensures that a wild symbol in the third column will always result in a winning combination when selected on combination with a triggering combination of symbols.

At step 540, processor 204 determines whether the reel strips have changed for this game instance and if so proceeds to step 550 and conducts an additional evaluation relative to game instances where the reel strips are not changed. In this example, the additional evaluation is the step 550 of evaluating the cash on reel symbols from left to right beginning on the third reel. That is, if there are one or more cash on reel symbols in the third column 813, processor 204 will make an award of the prize(s) on the cash on reel symbol(s) and also proceed to evaluate whether there are any cash on reel symbols in the fourth column 814. If there are no cash on reel symbols in the third column, the processor does not proceed to the fourth column. Similarly, processor 204 only proceeds to the fifth column if there are cash on reel symbols in both the third and fourth columns. In the example of FIG. 10, there are cash on reel symbols in both the third and fourth columns 814, 815 and hence the prizes of all eight cash on reel symbols 941-948 are awarded.

In the example of FIGS. 8 to 10, the third reel strip consists solely of Wild and cash on reel symbols and accordingly is a guaranteed win reel strip because irrespective of whether the symbols selected for the third column are all wild symbols, all cash on reel symbols or a combination thereof, a winning outcome will always occur based on the evaluations performed by processor 204 in steps 530 and 550.

At step 555, processor 204 updates a win meter in memory 208 to reflect each winning outcome.

At step 560 processor 204 determines whether a trigger condition has been met for triggering a feature game in the form of series of free games. In an example, the trigger condition is the occurrence of a feature triggering combination of symbols in the form of 3 or more "Scat" symbols in the base game. In an example, the feature can only be triggered in case where the third to fifth reels are not changed. The number of free games conducted depends on whether there are 3, 4, or 5 Scat symbols in the triggering combination.

Figure 11:
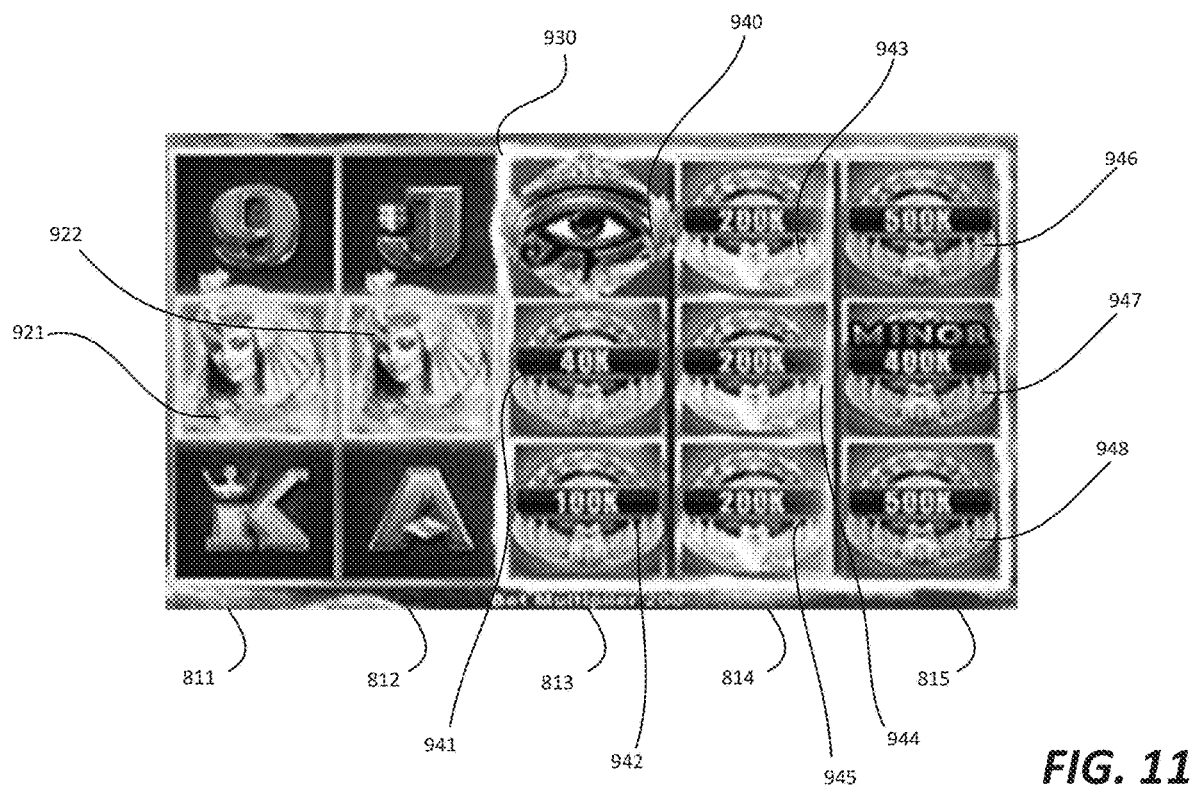
Figure 12:
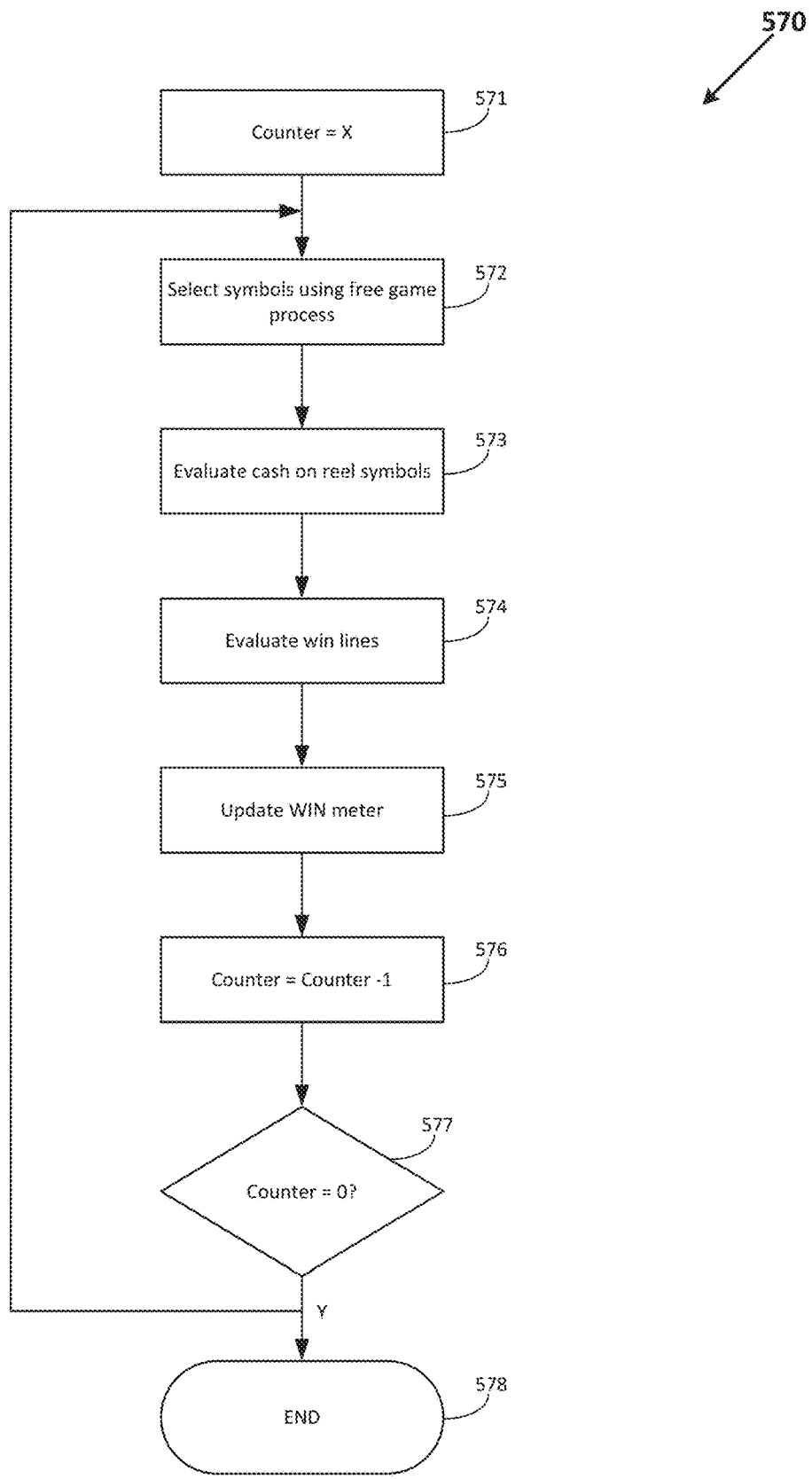
FIG. 12 is a flow chart showing detail of the method of operating a gaming device of FIG. 6.

If the feature game is triggered, processor 204 proceeds to step 570 and conducts a series of free games illustrated by FIGS. 11 and 12.

At step 571, the processor sets a number of free games to be carried out based on the triggering combination by initializing a counter to X, the awarded number of free games.

Figure 7:
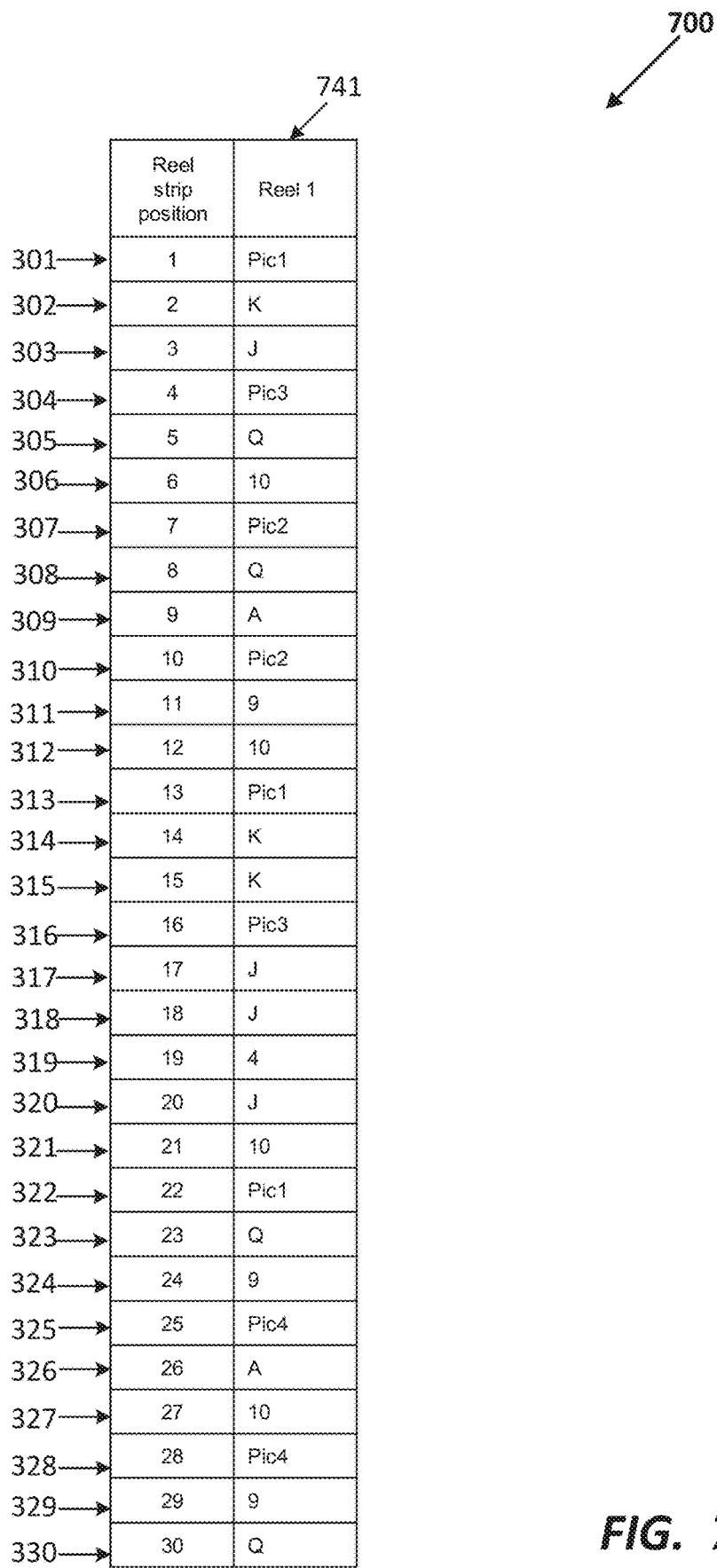
FIG. 7 illustrates an example reel strip layout.

At step 572, the processor 204 selects symbols using a free game process 1300 which is a modification to the process shown in FIG. 4. In an example, the feature game is characterized by ensuring that a triggering combination of symbols will occur in each free game, thus ensuring that the third to fifth reel strips will change in each free game. To achieve this, firstly processor 204 employs a free games first reel strip 741 shown in FIG. 7 having a symbol from each triggering combination (here Pic1, Pic2, Pic3 and Pic4) at every third symbol position of the reel strip 741 so that one (and only one) of the symbols will be selected each time processor 204 iterates through the symbol selection process when n=1. Secondly, after step 420, processor 204 determines at step 1310 whether n=2 and if it is proceeds to step 1320 of mapping symbols of the first reel strip to the second column 812 of symbol positions using the same mapping used for the first column 811 of symbol positions (i.e. the mapping resulting from steps 430-450). As a result, the first and second columns are populated by the same symbol and will include one (and only one) triggering combination of symbols. In an example, the first and duplicate first reel strips spin to a stop in unison.

At step 1330, processor 204 determines whether n=3 and if so proceed to step 1340 of setting the third to fifth reel strips based on the identity of the triggering combination. At step 1350, the processor 204 configures the configurable symbols using the process outlined above before proceeding to step 430 as outline in relation to FIG. 4.

In further variations to the above, there may be different numbers of columns of symbol positions, for example 3, 4 or 6 columns of symbol positions and there may be different number of symbol positions in each column, for example, 4 or 5 symbol positions.

The following non-limiting, numbered examples are provided to further describe selected embodiments of the disclosed subject matter.

Example 1 is a gaming device comprising: a display; a processor; and a memory storing (i) a trigger data structure defining a first triggering combination of symbols, (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, and (iii) instructions which when executed by the processor cause the processor to: conduct a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip; control the display to display the selected symbols at the respective symbol positions; evaluate the selected symbols to determine whether to make one or more prize awards including by, where the guaranteed win reel strip is used, determining the at least one prize award based on at least the selected symbols for the third column; and increment a win meter by each made prize award.

In Example 2, the subject matter of Example 1 wherein the trigger data structure defines a plurality triggering combinations of symbols including the first triggering combination of symbols, and each triggering combinations of symbols is different.

In Example 3, the subject matter of Example 2 wherein the plurality of reel strips includes a plurality of different guaranteed win reel strips associated with the third column and associated with respective ones of the triggering combinations of symbols, and wherein the triggered process comprises upon the selected symbols for the first column and second column including one of the triggering combinations of symbols, selecting symbols for the third column from the guaranteed win reel strip associated with the respective triggering combination of symbols.

In Example 4, the subject matter of any one or more of Examples 1-3 wherein the reel strip associated with the first column is configured so that only one of the plurality of triggering combinations can occur when the symbols are selected from the individual ones of the plurality of reel strips associated with the first and second columns.

In Example 5, the subject matter of any one or more of Examples 1-4 wherein each of the reel strips associated with the third to fifth columns comprise configurable symbols, and wherein the memory comprises a symbol configuring data structure comprising at least one weighted table comprising a plurality of assignable prizes and defining relative probabilities of assigning individual ones of the assignable prizes, and wherein when the instructions are executed by the processor, they cause the processor to randomly assign a prize of the plurality of prizes to at least each configurable symbol selected for one of the columns of symbol positions using the at least one weighted table.

In Example 6, the subject matter of Example 5 wherein the symbol configuring data structure comprises a plurality of weighted tables each associated with a respective one of the triggering combinations of symbols, and wherein at least upon symbols being selected for the third column using the triggered process, the processor assigns prizes to at least each selected configurable symbol using the at least one weighted table associated with the triggering combination.

In Example 7, the subject matter of any one or more of Examples 5-6 wherein the guaranteed reel strip associated with the third column consists of configurable symbols and wild symbols.

In Example 8, the subject matter of any one or more of Examples 5-7 wherein when the instructions are executed by the processor, they cause the processor to, upon symbols being selected for the third column using the triggered process, evaluate any selected configurable symbols from left to right from the third column when determining whether to make one or more prize awards based on configurable symbols.

In Example 9, the subject matter of any one or more of Examples 1-8 wherein evaluating the selected symbols comprises evaluating the selected symbols from left to right based on a set of defined win lines.

In Example 10, the subject matter of any one or more of Examples 1-9 wherein the trigger data structure defines a feature trigger, and wherein upon the selected symbols comprising the feature trigger, the processor initiates a series of free games, wherein in each of the free games, symbols are selected for the first column are duplicated to neighboring positions of the second column from a reel strip configured to ensure one of a plurality triggering combinations of symbols is selected in each free game.

Example 11 is a method of operating a gaming device comprising a display and a memory storing (i) a trigger data structure defining a first triggering combination of symbols, and (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, the method comprising: conducting a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip; controlling the display to display the selected symbols at the respective symbol positions; evaluating the selected symbols to determine whether to make one or more prize awards including by, where the guaranteed win reel strip is used, determining the at least one prize award based on at least the selected symbols for the third column; and incrementing a win meter by each made prize award.

In Example 12, the subject matter of Example 11 wherein the trigger data structure defines a plurality triggering combinations of symbols including the first triggering combination of symbols, and each triggering combinations of symbols is different.

In Example 13, the subject matter of Example 12 wherein the plurality of reel strips includes a plurality of different guaranteed win reel strips associated with the third column and associated with respective ones of the triggering combinations of symbols, and wherein the triggered process comprises upon the selected symbols for the first column and second column including one of the triggering combinations of symbols, selecting symbols for the third column from the guaranteed win reel strip associated with the respective triggering combination of symbols.

In Example 14, the subject matter of any one or more of Examples 12-13 wherein the reel strip associated with the first column is configured so that only one of the plurality of triggering combinations can occur when the symbols are selected from the individual ones of the plurality of reel strips associated with the first and second columns.

In Example 15, the subject matter of any one or more of Examples 11-14 wherein each of the reel strips associated with the third to fifth columns comprise configurable symbols, and wherein the memory comprises a symbol configuring data structure comprising at least one weighted table comprising a plurality of assignable prizes and defining relative probabilities of assigning individual ones of the assignable prizes, and wherein the method comprises randomly assigning a prize of the plurality of prizes to at least each configurable symbol selected for one of the columns of symbol positions using the at least one weighted table.

In Example 16, the subject matter of Example 15 wherein the symbol configuring data structure comprises a plurality of weighted tables each associated with a respective one of the triggering combinations of symbols, and wherein at least upon symbols being selected for the third column using the triggered process, the method comprises assigning prizes to at least each selected configurable symbol using the at least one weighted table associated with the triggering combination.

In Example 17, the subject matter of any one or more of Examples 15-16 wherein the guaranteed reel strip associated with the third column consists of configurable symbols and wild symbols.

In Example 18, the subject matter of any one or more of Examples 15-17 wherein the method comprises, upon symbols being selected for the third column using the triggered process, evaluating any selected configurable symbols from left to right from the third column when determining whether to make one or more prize awards based on configurable symbols.

In Example 19, the subject matter of any one or more of Examples 11-18 optionally include, wherein evaluating the selected symbols comprises evaluating the selected symbols from left to right based on a set of defined win lines.

Example 20 is a system comprising: one or more processors; and at least one memory storing (i) a trigger data structure defining a first triggering combination of symbols, (ii) a reel strip data structure defining a plurality of reel strips and defining an association between each reel strip and five columns of symbol positions, wherein individual ones of the plurality of reel strips are associated with the first and second columns of symbol positions respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, and (iii) instructions which when executed by the one or more processors, cause the one or more processors to: conduct a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip; control a display to display the selected symbols at the respective symbol positions; evaluate the selected symbols to determine whether to make one or more prize awards including by, where the guaranteed win reel strip is used, determining the at least one prize award based on at least the selected symbols for the third column: and increment a win meter by each made prize award.

Example 21 is a gaming device comprising: a display; a processor, and a memory storing (i) a trigger data structure defining a plurality of triggering combinations of symbols comprising at least a first triggering combination of symbols and a second triggering combination of symbols, (ii) a reel strip data structure defining a plurality of reel strips and defining an association between each reel strip and one of a plurality of columns of symbol positions, the plurality of reel strips including default reel strips associated with each of the plurality of columns, and (iii) instructions which when executed by the processor cause the processor to: conduct a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips; control the display to display the selected symbols at the respective symbol positions; evaluate the selected symbols to determine whether to make one or more prize awards; and increment a win meter by each made prize award.

In Example 22, the subject matter of Example 21 wherein the trigger data structure comprises a third triggering combination of symbols, and wherein the triggered process comprises, upon the selected symbols for the first column and second column including the third triggering combination, selecting symbols for the third to fifth columns from reel strips wherein at least the third reel strip is changed relative to the default third to fifth reel strips to provide an increased chance of a winning outcome in in conjunction with the third triggering combination of symbols.

In Example 23, the subject matter of any one or more of Examples 21-22 wherein the trigger data structure comprises a fourth triggering combination of symbols and wherein the triggered process comprises, upon the selected symbols for the first column and second column including the fourth triggering combination, selecting symbols for the third to fifth columns from reel strips wherein at least the third reel strip is changed relative to the default third to fifth reel strips to provide an increased chance of a winning outcome in in conjunction with the fourth triggering combination of symbols.

In Example 24, the subject matter of any one or more of Examples 21-23 wherein the reel strip associated with the first column is configured so that only one of the plurality of triggering combinations can occur when the symbols are selected from the individual ones of the plurality of reel strips associated with the first and second columns.

In Example 25, the subject matter of any one or more of Examples 21-24 wherein each of the reel strips associated with the third to fifth columns comprise configurable symbols, and wherein the memory comprises a symbol configuring data structure comprising a plurality of weighted tables each associated with a respective one of the triggering combinations of symbols, each weighted table comprising a plurality of assignable prizes and defining relative probabilities of assigning individual ones of the assignable prizes, and wherein at least upon symbols being selected for the using the triggered process, the processor assigns prizes to at least each selected configurable symbol using the at least one weighted table associated with the triggering combination.

In Example 26, the subject matter of Example 25 wherein when the instructions are executed by the processor, they cause the processor to, upon symbols being selected for the third column using the triggered process, evaluate any selected configurable symbols from left to right from the third column when determining whether to make one or more prize awards based on configurable symbols.

In Example 27, the subject matter of any one or more of Examples 22-26 wherein evaluating the selected symbols comprises evaluating the selected symbols from left to right based on a set of defined win lines.

Example 28 is a method of operating a gaming device comprising a display, and a memory storing (i) a trigger data structure defining a plurality of triggering combinations of symbols comprising at least a first triggering combination of symbols and a second triggering combination of symbols, and (ii) reel strip data structure defining a plurality of reel strips and defining an association between each reel strip and one of a plurality of columns of symbol positions, the plurality of reel strips including default reel strips associated with each of the plurality of columns, the method comprising: conducting a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips; controlling the display to display the selected symbols at the respective symbol positions; evaluating the selected symbols to determine whether to make one or more prize awards; and incrementing a win meter by each made prize award.

In Example 29, the subject matter of Example 28 wherein the trigger data structure comprises a third triggering combination of symbols, and wherein the triggered process comprises, upon the selected symbols for the first column and second column including the third triggering combination, selecting symbols for the third to fifth columns from reel strips wherein at least the third reel strip is changed relative to the default third to fifth reel strips to provide an increased chance of a winning outcome in in conjunction with the third triggering combination of symbols.

In Example 30, the subject matter of any one or more of Examples 28-29 wherein the trigger data structure comprises a fourth triggering combination of symbols and wherein the triggered process comprises, upon the selected symbols for the first column and second column including the fourth triggering combination, selecting symbols for the third to fifth columns from reel strips wherein at least the third reel strip is changed relative to the default third to fifth reel strips to provide an increased chance of a winning outcome in in conjunction with the fourth triggering combination of symbols.

In Example 31, the subject matter of any one or more of Examples 28-30 wherein the reel strip associated with the first column is configured so that only one of the plurality of triggering combinations can occur when the symbols are selected from the individual ones of the plurality of reel strips associated with the first and second columns.

In Example 32, the subject matter of any one or more of Examples 28-31 wherein each of the reel strips associated with the third to fifth columns comprise configurable symbols, and wherein the memory comprises a symbol configuring data structure comprising a plurality of weighted tables each associated with a respective one of the triggering combinations of symbols, each weighted table comprising a plurality of assignable prizes and defining relative probabilities of assigning individual ones of the assignable prizes, and wherein at least upon symbols being selected for the third column using the triggered process, the method comprises assigning prizes to at least each selected configurable symbol using the at least one weighted table associated with the triggering combination.

In Example 33, the subject matter of Example 32 optionally includes upon symbols being selected for the third column using the triggered process, evaluating any selected configurable symbols from left to right from the third column when determining whether to make one or more prize awards based on configurable symbols.

In Example 34, the subject matter of any one or more of Examples 28-33 wherein evaluating the selected symbols comprises evaluating the selected symbols from left to right based on a set of defined win lines.

Example 35 is a gaming system comprising: one or more processors; and at least one memory storing (i) a trigger data structure defining a plurality of triggering combinations of symbols comprising at least a first triggering combination of symbols and a second triggering combination of symbols, (ii) a reel strip data structure defining a plurality of reel strips and defining an association between each reel strip and one of a plurality of columns of symbol positions, the plurality of reel strips including default reel strips associated with each of the plurality of columns, and (iii) instructions which when executed by the one or more processors cause the one or more processors to: conduct a random symbol selection process to populate the plurality of columns of symbol positions with symbols, the symbol selection process comprising selecting symbols from first and second default reel strips for the first and second columns, a triggered process comprising upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and a default process for when the triggered process is not conducted comprising selecting symbols for the third to fifth columns by selecting symbols from the third to fifth default reel strips; control a display to display the selected symbols at the respective symbol positions; evaluate the selected symbols to determine whether to make one or more prize awards; and increment a win meter by each made prize award.

Example 36 is a gaming device comprising: a display; a processor; and a memory storing (i) a trigger data structure defining a first triggering combination of symbols, (ii) a reel strip data structure defining a plurality of reel strips and defining an association between each reel strip and one of a plurality of columns of symbol positions comprising at least a first, second and third column of symbol positions, wherein individual ones of the plurality of reel strips are associated with the first and second columns respectively and at least two different reel strips of the plurality of reel strips are associated with the third column, the at least two different reel strips comprising a default reel strip and a guaranteed win reel strip having a symbol arrangement that guarantees evaluation of the selected symbols will result in at least one prize award in conjunction with the first triggering combination of symbols, and (iii) instructions which when executed by the processor cause the processor to: conduct a random symbol selection process to populate the plurality of columns of symbol positions with symbols, the symbol selection process comprising selecting symbols from the individual ones of the plurality of reel strips associated with the first and second columns, a triggered process comprising, upon the selected symbols for the first column and second column including the first triggering combination, selecting symbols for the third column from the guaranteed win reel strip, and a default process for when the triggered process is not conducted comprising selecting symbols for the third column by selecting symbols for the third column from the default reel strip; control the display to display the selected symbols at the respective symbol positions; evaluate the selected symbols to determine whether to make one or more prize awards including by, where the guaranteed win reel strip us used, determining the at least one prize award based on at least the selected symbols for the third column; and increment a win meter by each made prize award. In an embodiment, the plurality of columns of symbol positions comprise fourth and fifth columns of symbol positions.

Example 37 includes one or more non-transitory media including software stored thereon, the software including instructions for controlling one or more devices to perform a method, the method comprising: retaining in the non-transitory media (i) a trigger data structure defining a plurality of triggering combinations of symbols comprising at least a first triggering combination of symbols and a second triggering combination of symbols, and (ii) reel strip data structure defining a plurality of reel strips and defining an association between each reel strip and one of a plurality of columns of symbol positions, the plurality of reel strips including default reel strips associated with each of the plurality of columns: conducting a random symbol selection process to populate the plurality of columns of symbol positions with symbols, the symbol selection process comprising, selecting symbols from first and second default reel strips for the first and second columns, In the absence of the triggering combination is defined by the trigger data structure, selecting symbols for the third to fifth columns by selecting symbols from the third to fifth default reel strips; in response to determining occurrence of a triggering combination as defined by the trigger data structure, executing a triggered process comprising, upon the selected symbols for the first column and second column including the first triggering combination, selecting symbols for the third to fifth columns from reel strips wherein at least the third reel strip is changed relative to the default third to fifth reel strips to provide an increased chance of a winning outcome in in conjunction with the first triggering combination of symbols, and upon the selected symbols for the first column and second column including the second triggering combination, selecting symbols for the third to fifth columns from reel strips wherein at least the third reel strip is changed relative to the default third to fifth reel strips to provide an increased chance of a winning outcome in in conjunction with the second triggering combination of symbols, and initiating control of a display to display the selected symbols at the respective symbol positions; evaluating the selected symbols to determine whether to make one or more prize awards; and incrementing a win meter by each made prize award.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:
a display;
a processor; and
a memory storing (i) a trigger data structure defining a first triggering combination of symbols, (ii) a reel strip data structure defining a plurality of reel strips and defining an association between each reel strip and five columns of symbol positions, wherein individual ones of the plurality of reel strips are associated with first and second columns of symbol positions respectively and at least two different reel strips of the plurality of reel strips are associated with a third column; the at least two different reel strips comprising a default reel strip and a guaranteed win reel strip having a symbol arrangement that guarantees evaluation of selected symbols will result in at least one prize award in conjunction with the first triggering combination of symbols, the guaranteed win reel strip including at least one symbol not included in the individual ones of the plurality of reel strips associated with the first and second columns, and (iii) instructions which when executed by the processor cause the processor to:
conduct a random symbol selection process to populate a plurality of columns of symbol positions with symbols, the random symbol selection process comprising,
selecting symbols from the individual ones of the plurality of reel strips associated with the first and second columns,
a triggered process comprising, upon the selected symbols for the first and second columns including the first triggering combination, selecting symbols for the third column from the guaranteed win reel strip, and
a default process for when the triggered process is not conducted comprising selecting the symbols for the third column by selecting the symbols for the third column from the default reel strip;
control the display to display the selected symbols at respective symbol positions;
evaluate the selected symbols to determine whether to make one or more prize awards including by, where the guaranteed win reel strip is used, determining at least one prize award based on at least the selected symbols for the third column; and
increment a win meter by each made prize award; wherein:
the processor controls the display to display the individual ones of the plurality of reel strips associated with the first and second columns of symbol positions in a stopped state;
while the display displays the individual ones of the plurality of reel strips associated with the first and second columns of symbol positions in a stopped state, the processor controls the display to display one of the at least two different reel strips of the plurality of reel strips associated with the third column as spinning;

the processor controls the display to stopping of the one of the at least two different reel strips of the plurality of reel strips associated with the third column spinning; and in response to displaying the stopping of the one of the at least two different reel strips of the plurality of reel strips associated with the third column spinning, the processor controls the display to the individual ones of the plurality of reel strips associated with the first and second columns of symbol positions and one of the at least two different reel strips of the plurality of reel strips associated with the third column in the stopped state.

2. The gaming device as claimed in claim 1, wherein the trigger data structure defines a plurality of triggering combinations of symbols including the first triggering combination of symbols, and each triggering combination of symbols is different.

3. The gaming device as claimed in claim 2, wherein the plurality of reel strips includes a plurality of different guaranteed win reel strips associated with the third column and associated with respective ones of the plurality of triggering combinations of symbols, and wherein the triggered process comprises upon the selected symbols for the first and second columns including one of the plurality of triggering combinations of symbols, selecting the symbols for the third column from the guaranteed win reel strip associated with a respective triggering combination of symbols.

4. The gaming device as claimed in claim 2, wherein a reel strip associated with the first column is configured so that only one of the plurality of triggering combinations can occur when the symbols are selected from the individual ones of the plurality of reel strips associated with the first and second columns.

5. The gaming device as claimed in claim 1, wherein each of the reel strips associated with the third to fifth columns comprise configurable symbols, and wherein the memory comprises a symbol configuring data structure comprising at least one weighted table comprising a plurality of assignable prizes and defining relative probabilities of assigning individual ones of the plurality of assignable prizes, and wherein when the instructions are executed by the processor, they cause the processor to randomly assign a prize of the plurality of assignable prizes to at least each configurable symbol selected for one of the columns of symbol positions using the at least one weighted table.

6. The gaming device as claimed in claim 5, wherein the guaranteed win reel strip associated with the third column consists of the configurable symbols and wild symbols.

7. The gaming device as claimed in claim 5, wherein when the instructions are executed by the processor, they cause the processor to, upon the symbols being selected for the third column using the triggered process, evaluate any selected configurable symbols from left to right from the third column when determining whether to make one or more prize awards based on the configurable symbols.

8. The gaming device as claimed in claim 7, wherein evaluating the selected configurable symbols comprises evaluating the selected configurable symbols from left to right based on a set of defined win lines.

9. The gaming device as claimed in claim 1, wherein the trigger data structure defines a feature trigger, and wherein upon the selected symbols comprising the feature trigger, the processor initiates a series of free games, wherein in each of the series of free games, the symbols selected for the first column are duplicated to neighboring positions of the second column from a reel strip configured to ensure one of a plurality of triggering combinations of symbols is selected in each free game.

10. A method of operating a gaming device comprising a display, a processor, and a memory storing (i) a trigger data structure defining a first triggering combination of symbols, and (ii) a reel strip data structure defining a plurality of reel strips and defining an association between each reel strip and five columns of symbol positions, wherein individual ones of the plurality of reel strips are associated with first and second columns of symbol positions respectively, and at least two different reel strips of the plurality of reel strips are associated with a third column, the at least two different reel strips comprising a default reel strip and a guaranteed win reel strip having a symbol arrangement that guarantees evaluation of selected symbols will result in at least one prize award in conjunction with the first triggering combination of symbols, the guaranteed win reel strip including at least one symbol not included in the individual ones of the plurality of reel strips associated with the first and second columns, the method performed by the processor and comprising:

conducting a random symbol selection process to populate a plurality of columns of symbol positions with symbols, the random symbol selection process comprising, selecting the symbols from the individual ones of the plurality of reel strips associated with the first and second columns, a triggered process comprising, upon the selected symbols for the first and second columns including the first triggering combination of symbols, selecting the symbols for the third column from the guaranteed win reel strip, and a default process for when the triggered process is not conducted comprising selecting the symbols for the third column by selecting the symbols for the third column from the default reel strip;

controlling the display to display the selected symbols at respective symbol positions;

evaluating the selected symbols to determine whether to make one or more prize awards including by, where the guaranteed win reel strip is used, determining at least one prize award based on at least the selected symbols for the third column; and incrementing a win meter by each made prize award; wherein:

the processor controls the display to display the individual ones of the plurality of reel strips associated with the first and second columns of symbol positions in a stopped state;

while the display displays the individual ones of the plurality of reel strips associated with the first and second columns of symbol positions in a stopped state, the processor controls the display to display one of the at least two different reel strips of the plurality of reel strips associated with the third column as spinning;

the processor controls the display to stopping of the one of the at least two different reel strips of the plurality of reel strips associated with the third column spinning; and in response to displaying the stopping of the one of the at least two different reel strips of the plurality of reel strips associated with the third column spinning, the processor controls the display to the individual ones of the plurality of reel strips associated with the first and second columns of symbol positions and one of the at least two different reel strips of the plurality of reel strips associated with the third column in the stopped state.

11. The method as claimed in claim 10, wherein the trigger data structure defines a plurality of triggering combinations of symbols including the first triggering combination of symbols, and each triggering combination of symbols is different.

12. The method as claimed in claim 11, wherein the plurality of reel strips includes a plurality of different guaranteed win reel strips associated with the third column and associated with respective ones of the plurality of triggering combinations of symbols, and
wherein the triggered process comprises upon the selected symbols for the first and second columns including one of the plurality of triggering combinations of symbols, selecting the symbols for the third column from the guaranteed win reel strip associated with a respective triggering combination of symbols.

13. The method as claimed in claim 11, wherein a reel strip associated with the first column is configured so that only one of the plurality of triggering combinations of symbols can occur when the symbols are selected from the individual ones of the plurality of reel strips associated with the first and second columns.

14. The method as claimed in claim 11, wherein each of the reel strips associated with the third to fifth columns comprise configurable symbols, and wherein the memory comprises a symbol configuring data structure comprising at least one weighted table comprising a plurality of assignable prizes and defining relative probabilities of assigning individual ones of the plurality of assignable prizes, and wherein the method comprises randomly assigning a prize of the plurality of assignable prizes to at least each configurable symbol selected for one of the plurality of columns of symbol positions using the at least one weighted table.

15. The method as claimed in claim 14, wherein the symbol configuring data structure comprises a plurality of weighted tables each associated with a respective one of the plurality of triggering combinations of symbols, and wherein at least upon symbols being selected for the third column using the triggered process, the method comprises assigning prizes to at least each selected configurable symbol using the at least one weighted table associated with a triggering combination.

16. The method as claimed in claim 14, wherein the method comprises, upon symbols being selected for the third column using the triggered process, evaluating any selected configurable symbols from left to right from the third column when determining whether to make one or more prize awards based on the configurable symbols.

17. One or more non-transitory media including software stored thereon, the software including instructions executable by a processor to control one or more devices to perform a method, the method comprising:
retaining in the non-transitory media (i) a trigger data structure defining a plurality of triggering combinations of symbols comprising at least a first triggering combination of symbols and a second triggering combination of symbols, and (ii) a reel strip data structure defining a plurality of reel strips and defining an association between each reel strip and one of a plurality of columns of symbol positions, the plurality of reel strips including default reel strips associated with each of the plurality of columns of symbol positions;
conducting a random symbol selection process to populate the plurality of columns of symbol positions with symbols, the random symbol selection process comprising,
selecting symbols from first and second default reel strips for first and second columns, wherein in an absence of a triggering combination, the selecting is defined by the trigger data structure, selecting symbols for third to fifth columns by selecting symbols from third to fifth default reel strips wherein the third to fifth default reel strips include at least one symbol not included in the first and second default reel strips;
in response to determining occurrence of the triggering combination as defined by the trigger data structure, executing a triggered process comprising,
upon the selected symbols for the first and second columns including the first triggering combination of symbols, selecting the symbols for the third to fifth columns from reel strips wherein at least a third reel strip is changed relative to the third to fifth default reel strips to provide an increased chance of a winning outcome in conjunction with the first triggering combination of symbols, and
upon the selected symbols for the first and second columns including the second triggering combination of symbols, selecting symbols for the third to fifth columns from the plurality of reel strips wherein at least the third reel strip is changed relative to the third to fifth default reel strips to provide an increased chance of a winning outcome in conjunction with the second triggering combination of symbols,
initiating control of a display to display the selected symbols at respective symbol positions;
evaluating the selected symbols to determine whether to make one or more prize awards; and
incrementing a win meter by each made prize award; wherein:
the processor controls the display to display first reel strips of the plurality of reel strips associated with the first and second columns in a stopped state;
while the display displays the first reel strips of the plurality of reel strips associated with the first and second columns in a stopped state, the processor controls the display to display a second reel strip of the plurality of reel strips associated with the third column as spinning;
the processor controls the display to stopping of the second reel strip of the plurality of reel strips associated with the third column spinning; and
in response to displaying the stopping of the third column spinning, the processor controls the display to the first reel strips of the plurality of reel strips associated with the first and second columns and the second reel strip of the plurality of reel strips associated with the third column in the stopped state.

18. The one or more non-transitory media as claimed in claim 17, wherein the trigger data structure comprises a third triggering combination of symbols, and wherein the triggered process further comprises, upon the selected symbols for the first and second columns including the third triggering combination of symbols, selecting the symbols for the third to fifth columns from the plurality of reel strips wherein at least the third reel strip is changed relative to the third to fifth default reel strips to provide an increased chance of a winning outcome in conjunction with the third triggering combination of symbols.

19. The one or more non-transitory media as claimed in claim 17, wherein each of the reel strips associated with the third to fifth columns comprise configurable symbols, and wherein the one or more non-transitory media further retains a symbol configuring data structure comprising a plurality of weighted tables each associated with a respective one of the plurality of triggering combinations of symbols, each weighted table comprising a plurality of assignable prizes and defining relative probabilities of assigning individual ones of the plurality of assignable prizes, and wherein at least upon the symbols being selected for the third column using the triggered process, the method comprises assigning prizes to at least each selected configurable symbol using at least one weighted table associated with the triggering combination.

20. The one or more non-transitory media as claimed in claim 19, comprising, upon the symbols being selected for the third column using the triggered process, evaluating any selected configurable symbols from left to right from the third column when determining whether to make one or more prize awards based on the configurable symbols.

\* \* \* \* \*